United States Patent [19]

Okada et al.

[11] Patent Number: 5,754,241
[45] Date of Patent: May 19, 1998

[54] VIDEO DECODER CAPABLE OF CONTROLLING ENCODED VIDEO DATA

[75] Inventors: Shigeyuki Okada, Hashima; Keita Kawahara, Ogaki; Naoki Tanahashi, Gifu; Hayato Nakashima, Gifu-ken, all of Japan

[73] Assignee: Sanyo Electric Co., Ltd, Osaka, Japan

[21] Appl. No.: 557,615

[22] Filed: Nov. 14, 1995

[30] Foreign Application Priority Data

| Nov. 18, 1994 | [JP] | Japan | 6-285193 |
| Nov. 30, 1994 | [JP] | Japan | 6-297347 |
| Mar. 24, 1995 | [JP] | Japan | 7-066471 |
| Jun. 30, 1995 | [JP] | Japan | 7-166382 |
| Oct. 19, 1995 | [JP] | Japan | 7-271372 |
| Oct. 19, 1995 | [JP] | Japan | 7-271377 |

[51] Int. Cl.$^6$ ............................................. H04N 7/32
[52] U.S. Cl. .................. 348/419; 348/405; 348/390; 386/8
[58] Field of Search ......................... 348/419, 405, 348/409, 412, 415, 402, 411, 390, 384, 699, 416, 413; 386/6–8, 68; 360/8; H04N 7/32

[56] References Cited

U.S. PATENT DOCUMENTS

| 5,038,209 | 8/1991 | Hang | 348/419 |
| 5,144,425 | 9/1992 | Joseph | 348/419 |
| 5,159,447 | 10/1992 | Haskell et al. | 348/419 |
| 5,241,401 | 8/1993 | Fujiwara et al. | 348/390 |
| 5,305,113 | 4/1994 | Iwamura et al. | 386/68 |
| 5,396,567 | 3/1995 | Jass | 348/405 |
| 5,398,072 | 3/1995 | Auld | 348/426 |
| 5,440,345 | 8/1995 | Shimoda | 348/411 |
| 5,452,103 | 9/1995 | Brusewitz | 348/419 |
| 5,459,515 | 10/1995 | Chevance et al. | 348/419 |
| 5,534,929 | 7/1996 | Tanaka | 348/419 |
| 5,543,853 | 8/1996 | Haskell et al. | 348/419 |
| 5,566,208 | 10/1996 | Balakrishnan | 348/419 |
| 5,583,650 | 12/1996 | Lane et al. | 386/81 |

Primary Examiner—Amelia Au
Assistant Examiner—Vu Le
Attorney, Agent, or Firm—Sheridan Ross P.C.

[57] ABSTRACT

An MPEG video decoder capable of preventing a buffer for storing a video stream from overflowing and/or underflowing. The video decoding apparatus decodes a coded video bit stream including a series of pictures to produce decoded pictures. The video decoding apparatus includes: a bit buffer for temporarily storing the video bit stream, a decoding circuit for receiving the video bit stream output from the bit buffer and decoding the video bit stream to produce decoded pictures, and a video bit stream control circuit for controlling an amount of the video bit stream to be supplied to the decoding circuit from the bit buffer based on an amount of data of the video bit stream stored in the bit buffer.

23 Claims, 13 Drawing Sheets

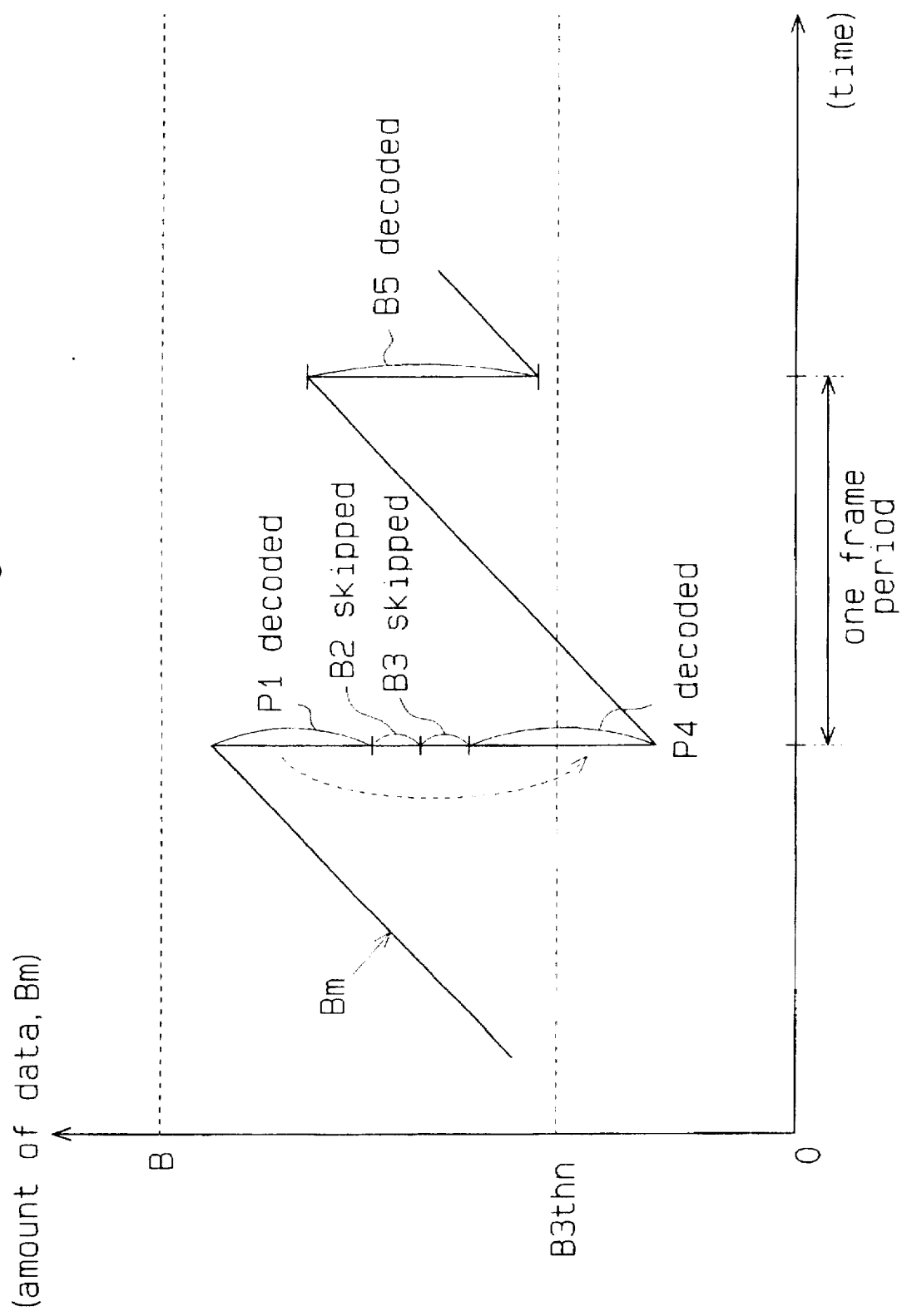

VIDEO DECODER CAPABLE OF CONTROLLING ENCODED VIDEO DATA

BACKGROUND OF THE INVENTION

1. Field of the Invention

The present invention relates generally to a decoder which decodes encoded video data. More particularly, the invention relates to an improvement on a video decoder which controls encoded video data stored in a buffer.

2. Description of the Related Art

Personal computers, as well as business and home entertainment systems, which handle a vast amount of and multifarious types and forms of multimedia information, should process digitally recorded video and audio information at a fast speed. Such fast information processing can be achieved by data compression and expansion techniques, which directly affect the processing speed. The "IMPEG" standards are one of such data compression and expansion techniques to improve the processing speed. The current MPEG standards are undergoing standardization by the MPEG Committee (ISO/IEC JTC1/SC29/WG11) under the ISO (International Organization for Standardization)/IEC (International Electrotechnical Commission).

The MPEG standards consist of three parts. Part 1 (ISO/IEC IS 11172-1: MPEG system part) defines the multiplex structure of video data and audio data and the synchronization system. Part 2 (ISO/IEC IS 11172-2: MPEG video part) defines the high efficiency coding system for video data and the format for video data. The part 3 (ISO/IEC IS 11172-3: MPEG audio part) defines the high efficiency coding system for audio data and the format for audio data.

Video data that is handled with respect to an MPEG video part includes moving pictures each consisting of several tens of (e.g., 30) frames per second. The video data has a six-layer structure of a sequence including a plurality of Groups Of Pictures (GOP's). GOP's each including a plurality of pictures, a plurality of slices in each picture, a plurality of macroblocks in each slice and a plurality of blocks in each macroblock.

At present, there are two MPEG standards, MPEG-1 and MPEG-2, that mainly differ in the encode rate at which video and audio data are encoded. In MPEG-1, frames are associated with pictures. In MPEG-2, either a frame or a field is associated with a picture. Two fields constitute one frame. The structure where a frame is associated with a picture is called a frame structure, while the structure where a field is associated with a picture is called a field structure.

In MPEG, a compression technique called intra-frame prediction is employed. Intra-frame prediction compresses intra-frame data based on a chronological correlation among frames. Intra-frame prediction includes bidirectional prediction. Bidirectional prediction uses both forward prediction for predicting a current reproduced image (or picture) from an old reproduced image (or picture) and backward prediction for predicting a current reproduced image from a future reproduced image.

Bidirectional prediction uses I (Intra-coded) picture, P (Predictive-coded) picture and B (Bidirectionally-coded) picture. An I-picture is produced independently irrespective of old and future reproduced images. A P-picture is produced by forward prediction (prediction from an old decoded I- or P-picture). A B-picture is produced by bidirectional prediction. In bidirectional prediction, a B-picture is produced by one of the following three predictions.

(1) Forward Prediction: prediction from an old decoded I- or P-picture.

(2) Backward Prediction: prediction from a future decoded I- or P-picture.

(3) Bidirectional Prediction: prediction from old and future decoded I- or P-pictures.

An I-picture is produced without an old picture or a future picture, whereas every P-picture is produced by referring to an old picture and every B-picture is produced by referring to an old or future picture.

In intra-frame prediction, an I-picture is periodically produced first. Then, a frame several frames ahead of the I-picture is produced as a P-picture. This P-picture is produced by the prediction in one direction from the past to the present (forward direction). Next, a frame located before the I-picture and after the P-picture is produced as a B-picture. At the time this B-picture is produced, the optimal prediction scheme is selected from among forward prediction, backward prediction and bidirectional prediction. In general, a current image and its preceding and succeeding images in consecutive motion pictures are similar to one another and that they differ only partially. In this respect, it is assumed that the previous frame (e.g., I-picture) and the next frame (e.g., P-picture) are substantially the same. If there is a slight difference (B-picture data) between both frames, this difference is extracted and compressed. Accordingly, the intra-frame data can be compressed based on the chronological correlation among consecutive frames.

A stream of video data encoded according to the MPEG video standards in the above manner is called an MPEG video bit stream (hereinafter simply called "video stream"). MPEG-1 is mainly associated with storage media such as a CD (Compact Disc) and a CD-ROM (Compact Disc-Read Only Memory), while MPEG-2 includes the MPEG-1 and is used in a wide range of applications.

Decoders which use storage media should have the following three special playback(or reproduction) functions:

(1) Function to display(or reproduce) moving pictures at a speed faster than the normal playback speed. (This function is hereinafter called "fast playback".)

(2) Function to display moving pictures at a speed slower than the normal playback speed. (This function is hereinafter called "slow playback".)

(3) Function to display moving pictures frame by frame. (This function is hereinafter called "frame-by-frame advance playback".)

The fast playback function in forward mode allows a user to see moving pictures quickly. Fast forward playback or fast backward playback allow a user to search for a desired moving picture. The slow playback function and the frame-by-frame advance playback function allow a user to see moving pictures carefully.

FIG. 1 is a block circuit illustrating a conventional MPEG video decoder equipped with the fast playback function. An MPEG video decoder 101 comprises a bit buffer 102, a picture header detector 103, an MPEG video decode core circuit (hereinafter referred to simply as "decode core circuit") 104, a bit stream skip circuit 105, and a control core circuit 106. The control core circuit 106 controls the individual circuits 102 to 105.

A bit stream, which has been read from a recording medium 100 like a video CD by a data reader (not shown), is supplied to the bit buffer 102 via the bit stream skip circuit 105. The bit buffer 102 is a ring buffer equipped with a RAM (Random -Access Memory) which has an FIFO (First-In-First-Out) structure, and sequentially stores a bit stream. The picture header detector 103 detects a picture header at the head of each picture included in the bit stream that is stored in the bit buffer 102. Based on the detected picture header, the control core circuit 106 controls the bit buffer 102 in such a way as to read a bit stream corresponding to one picture every frame period. As each moving picture consists of 30 frames per second in the MPEG-1, one frame period is 1/30 sec.

The decode core circuit 104 receives each picture read from the bit buffer 102 and decodes it in conformity to the MPEG video part. Then, the decode core circuit 104 continuously supplies data of the individual decoded pictures as a video output to a display 107.

The bit buffer 102 temporarily stores I, P and B-pictures which differ from one another in the amount of data. The amount of data of an I-picture is about 30 Kbytes, the amount of data of a P-picture is about 10 to 15 Kbytes, and the amount of data of a B-picture ranges from 0 to about 6 Kbytes. In the normal playback mode, the bit rate RB of a bit stream is constant. The decode core circuit 104 performs data decoding for each of those pictures, and the decoding time varies depending on the amounts of data of the individual pictures. If a bit stream is transferred directly to the decode core circuit 104, the decode core circuit 104 cannot decode all the pictures. The bit buffer 102 functions as a buffer memory to store a bit stream and allows the decode core circuit 104 to decode the I, P and B-pictures irrespective of the amounts of their data.

The bit stream skip circuit 105 has a first node 105a for transferring a video stream directly to the bit buffer 102 in the normal playback mode, and a second node 105b for skipping a video stream in the fast playback mode. The control core circuit 106 selectively switches the connection to the first node 105a and the second node 105b in accordance with the playback speed to intermittently transfer a video stream to the bit buffer 102. That is, when the bit stream skip circuit 105 is set to the second node 105b, the video stream is not transferred to the bit buffer 102 and is skipped. As a result, the video stream that is to be transferred to the bit buffer 102 is thinned (i.e., reduced) by the skipped amount.

In the normal playback mode, the bit rate RB of a video stream to be supplied is constant. To prevent the overflow when there is a large amount of data of a video stream for one picture and the underflow when that amount of data is small, therefore, the occupying amount (or remaining amount) of the video stream in the bit buffer 102 should be controlled properly. The MPEG video part defines a virtual MPEG video decoder and defines the control of the occupying amount.

FIG. 2 is a graph showing the relationship between the occupying amount of a video stream in the bit buffer 102 and the time in the normal playback mode. The occupying amount Bm rises at the bit rate RB of the video stream, which represents the slope of the graph. The bit rate $R_9$ of a video stream is defined as given by an equation (1) below.

$$R_s = 400 \times BR \quad (1)$$

where BR is the bit rate of a sequence header provided at the head of a sequence.

The capacity B of the bit buffer 102 is defined as given by the following equation (2).

$$B = 16 \times 1024 \times VBS \quad (2)$$

where VBS is the video buffering verifier (VBV) buffer size of the sequence header.

The amount of data, X, of a video stream to be supplied to the bit buffer 102 in one frame period is defined as given by the following equation (3).

$$X = R_B R_P \quad (3)$$

where $R_F$ is the picture rate of a video stream which is defined by the picture rate of the sequence header. A video stream for one picture is read from the bit buffer 102 without pause in one frame period, and is decoded by the decode core circuit 104. The occupying amount Bm immediately after the continuous reading of the video stream is defined as given by the following equation (4). The occupying amount Bm is indicated by "$B_0$" to "$B_6$" as shown in FIG. 2.

$$0 < Bm < B - X = B - (R_B/R_P) \quad (4)$$

Defining the occupying amount Bm so as to satisfy the condition of the equation (4) prevents the overflow and underflow of the bit buffer 102. In other words, the occupying amount Bm that exceeds a threshold value represented by B−X indicates a high probability that the bit buffer 102 would overflow. In the normal playback mode, the bit rate $R_S$, the picture rate $R_P$ and the capacity B are so defined as to meet the equation (4). Further, setting the capacity B of the bit buffer 102 as given by the equation (2) prevents the overflow and underflow of the bit buffer 102.

In the fast playback mode, the bit rate of a video stream increases in accordance with the playback speed. When the playback speed in the fast playback mode is n times the normal playback speed, the bit rate of a video stream is n times the bit rate $R_S(=n \times R_B)$ in the normal playback mode. The capacity of the bit buffer 102 is set in association with the normal playback. An increase in the bit rate of the video stream causes the bit buffer 102 to overflow. To prevent this overflow, in the fast playback mode, the control core circuit 106 controls the video stream skip circuit 105 in accordance with the playback speed to thin the video stream that is to be transferred to the bit buffer 102. Consequently, the bit rate of the video stream becomes substantially equal to the bit rate RB in the normal playback mode, thereby preventing the overflow of the bit buffer 102.

According to the conventional MPEG video decoder 101, however, even if the capacity B of the bit buffer 102 is set as given by the equation (2) in the normal playback mode, the bit buffer 102 may overflow in the following two cases.

Case 1: The bit rate $R_B$ of a video stream read from a recording medium is not synchronized with the bit rate of the video output and the former bit rate $R_B$ is greater than the latter bit rate.

Case 2: The decode core circuit 104 does not decode a video stream in conformity to the MPEG standards.

Suppose that the bit buffer 102 overflows while the decode core circuit 104 is decoding an arbitrary picture. Then, although some of the video stream of the picture that is being decoded still remains in the bit buffer 102, it is overwritten with a newly supplied video stream. Consequently, the remaining video stream of that picture is destroyed and lost.

This makes it impossible for the decode core circuit 104 to finish decoding the picture, so that the video output of the picture will not be produced.

A P-picture is produced by referring to an old I- or P-picture and a B-picture is produced by referring to an old or future I- or P-picture. An I-picture, on the other hand, is produced without referring to an old picture or a future picture. When the video stream of an I- or P-picture is destroyed due to the overflow of the bit buffer 102, the decode core circuit 104 cannot decode P and B-pictures until the next I-picture is supplied from the bit buffer 102. It is apparent that the overflow of the bit buffer 102 disables the decoding of multiple pictures and causes some frames to be dropped from the moving pictures to be displayed. This frame dropping deteriorates the quality of moving pictures and the display of the moving pictures with a jerky motion. The resultant moving pictures are therefore not very presentable to a user.

In the fast playback mode, the control on the video stream skip circuit 105 by the control core circuit 106 is extremely complicated. Therefore, the control core circuit 106 should use a microcomputer, which inevitably increases the manufacturing cost and enlarges the overall apparatus.

Further, the control core circuit 106 controls the video stream skip circuit 105 in accordance with the playback speed in the fast playback mode. In accordance with this control, the video stream skip circuit 105 skips a video stream from the node 105b regardless of pictures. This allows the video stream skip circuit 105 to transfer the video stream of an interrupted picture to the bit buffer 102. When the supply of an I- or P-picture fails, therefore, the decode core circuit 104 cannot decode all the P-pictures and B-pictures until the next I-picture is transferred. When the video stream of an I-picture is not cut out, the decode core circuit 104 can decode that I-picture. I-pictures are included in a video stream at the ratio of about one or two frames per second. At the time of the fast playback which is two to four times faster than the normal playback, therefore, the number of undecodable pictures increases, thus causing some frames to be dropped from moving pictures. (Such fast playback will hereinafter be referred to as "2× fast playback or 4× fast playback.) This frame dropping causes moving pictures to be displayed on the screen of the display 107 at the rate of one to two frames per second. Such fast playback therefore becomes the same as the frame-by-frame advance playback, thus considerably deteriorating the quality of moving pictures so as to display the moving pictures with a jerky motion. The resultant moving pictures are therefore not very presentable to a user.

For example, a video CD player which uses a video CD as a recording medium reproduces moving pictures by a track jumping system. This system causes the optical pickup of the video CD player to intermittently scan the tracks on the video CD, skipping some tracks. The pickup repeats the operation of reading a predetermined amount of a video stream from a given record track and then jumping onto another record track. When an I-picture is included by chance in the video stream, that I-picture is decoded. According to this system, it is not possible to decode all the I-pictures in a video stream, producing undecodable I-pictures. At the time of the 2× to 4× fast playback, moving pictures are displayed at the rate of 0.1 to 0.5 frame per second. The number of I-pictures included in a video stream which is read at a time is not constant, and no I-pictures may be read in some case. In other words, the reproduced moving pictures do not have a constant time interval between frames and are very poor in quality.

To improve upon such a disadvantage, an I-picture scan system is defined in the video CD v2.0 standards. This scan system defines the inclusion of information of record tracks where I-pictures are stored in a video stream. This information is called "scan information". The control of the optical pickup by a video CD player which uses this scan information allows all the I-pictures in a video stream to be decoded. In the 2× to 4× fast playback mode, however, moving pictures can be only displayed at a rate of one to two frames per second.

In addition to the three types of pictures, I, P and B-pictures, a fourth picture, D-picture, is also defined. The D-picture includes a DC (Direct Current) component of a DCT (Discrete Cosine Transform) coefficient, and is located in a different sequence from that of the I, P and B-pictures. This D-picture is used to execute the fast forward playback or fast backward playback which allows a user to search for a desired moving picture. A D-picture is rarely included in a video stream, so that even when the D-picture is used in the 2× to 4× fast playback or faster playback, the obtained moving pictures neither show a smooth motion nor have a high quality.

There is another problem in the slow playback and frame-by-frame advance playback. In general, the bit rate of a video stream in the slow playback and frame-by-frame advance playback is the same as that in the normal playback. In the slow playback and frame-by-frame advance playback, therefore, the control core circuit 106 reduces the number of pictures to be read from the bit buffer 102 per unit time to thereby reduce the number of frames of moving pictures to be displayed on the display 107. To prevent the overflow and underflow of the bit buffer 102, the MPEG video decoder 101 reads a video stream from the recording medium and supplies it to the bit buffer 102 every time a picture is read from the bit buffer 102. This process demands the frequent repetition of reading a video stream. The frequent reading of a video stream from a video CD by a video CD player, for example, not only requires the complex control of the driving unit for the optical pickup but also increases the mechanical load on that driving unit and the occurrence of the failure thereof.

As mentioned earlier, the bit buffer 102 may underflow even if the occupying amount is properly controlled. For instance, when a video CD player is used as an external device, scratches on a disk and the vibration of the disk disables the reading of a video stream recorded on that disk. In this case, the video stream will not be transferred to the bit buffer 102, causing the underflow. This underflow is remedied as a new video stream is transferred to the bit buffer 102. While there is an underflow, the decode core circuit 104 is compelled to stop decoding operation so that no video output is produced. As a result, some frames are dropped from the moving pictures that are displayed on the screen of the display 107. Such frame dropping deteriorates the quality of moving pictures and causes the moving pictures to be displayed with a jerky motion. The resultant moving pictures are therefor not satisfactory to a user.

SUMMARY OF THE INVENTION

Broadly the present invention relates to an MPEG video decoder capable of preventing a buffer for storing a video stream from overflowing and/or underflowing.

The invention can be implemented in numerous ways, including as a method, a system, and an apparatus.

According to an embodiment of the invention, a video decoding apparatus for decoding a coded video bit stream including a series of pictures to produce decoded pictures, includes: a bit buffer for temporarily storing the video bit stream; a decoding circuit for receiving the video bit stream output from the bit buffer and decoding the video bit stream to produce decoded pictures; and a video bit stream control circuit for controlling an amount of the video bit stream to be supplied to the decoding circuit from the bit buffer based on an amount of data of the video bit stream stored in the bit buffer. The control circuit includes means for determining whether an amount of data stored in the bit buffer exceeds a threshold value that is predetermined as an amount of the video bit stream which can be safely stored in the bit buffer. The control circuit operates to skip a portion of the video bit stream in order to prevent the video bit stream from being supplied to the decoding circuit from the bit buffer, as long as the amount of data stored in the bit buffer exceeds the threshold value. Optionally, the video bit stream control circuit changes the threshold value in proportion to a playback speed for the decoded pictures. Further, the portion of the video bit stream to be skipped may be selected based upon the type of each picture and/or the amount of data for each picture.

According to another embodiment of the invention, a video decoding apparatus for decoding a coded video bit stream including a series of pictures to produce decoded pictures, includes: a bit buffer for temporarily storing the video bit stream; a decoding circuit for receiving the video bit stream output from the bit buffer and decoding the video bit stream to produce decoded pictures; and an operation control circuit for controlling a reading operation of the bit buffer and a decoding operation of the decoding circuit based on an amount of data of the video bit stream stored in the bit buffer. The operation control circuit operates to inhibit the reading operation of the bit buffer and the decoding operation of the decoding circuit in order to supply already decoded pictures during a period from a point of time at which an underflow of the bit buffer has occurred to a point of time at which the underflow is released.

BRIEF DESCRIPTION OF THE DRAWINGS

The invention, together with objects and advantages thereof, may best be understood by reference to the following description of the presently preferred embodiments together with the accompanying drawings, in which:

FIG. 9 is a graph showing the relationship between the occupying amount of a video stream in a bit buffer according to the fifth embodiment and time;

DETAILED DESCRIPTION OF THE PREFERRED EMBODIMENTS

Figure 1:
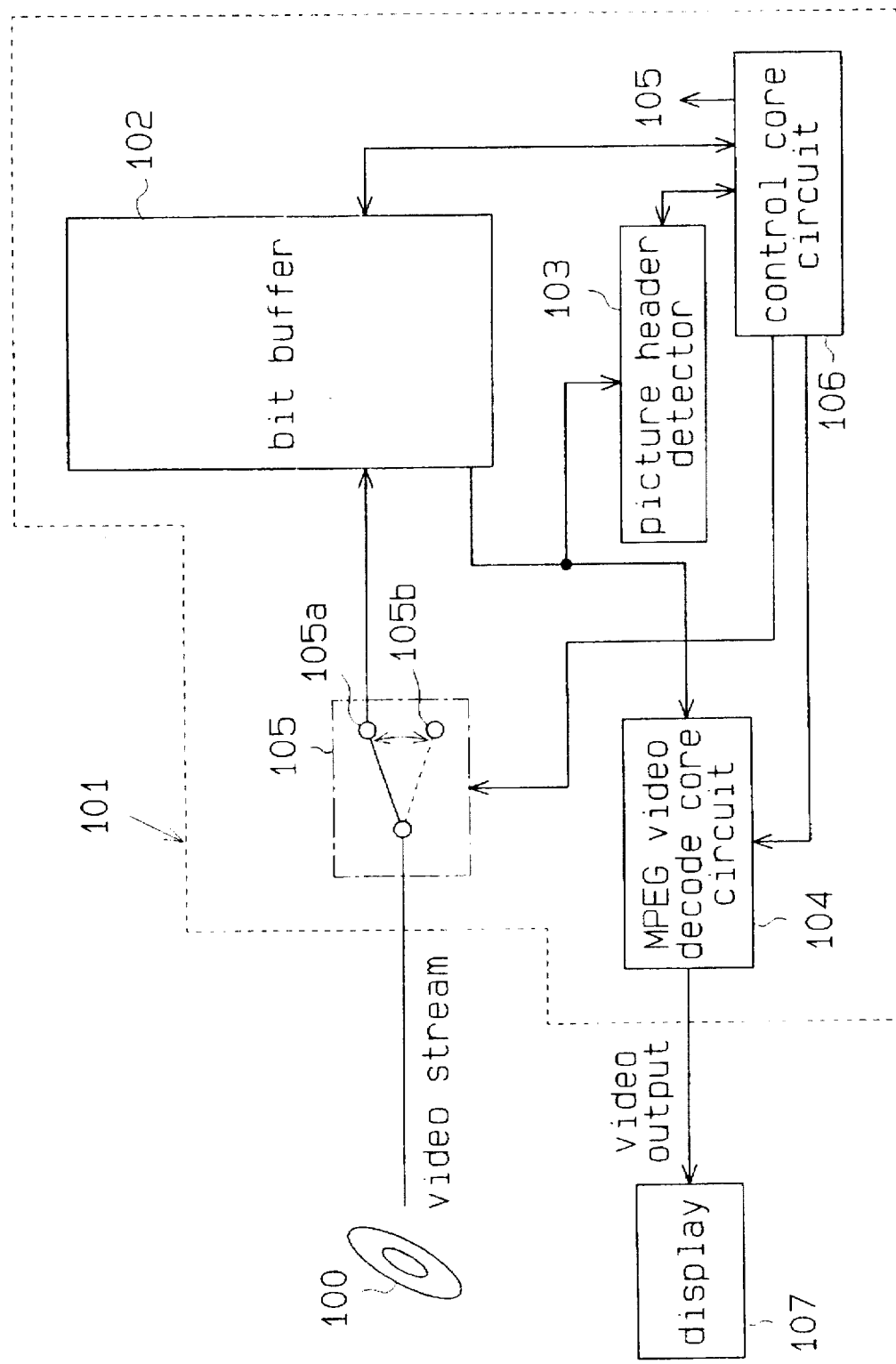
FIG. 1 is a block circuit diagram showing a conventional MPEG video-decoder.
Figure 2:
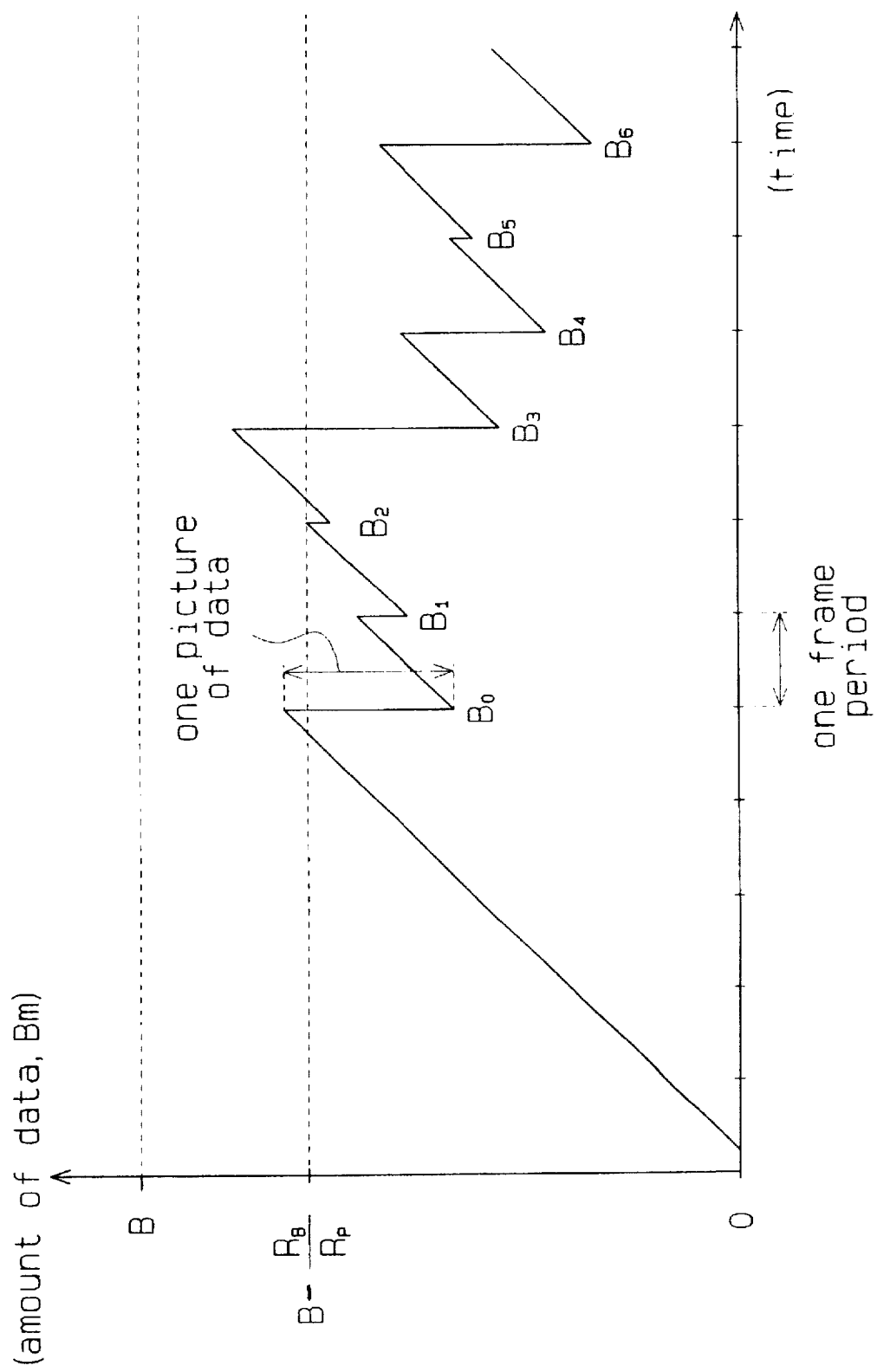
FIG. 2 is a graph showing the relationship between the occupying amount of a video stream in a conventional bit buffer and time.
Figure 3:
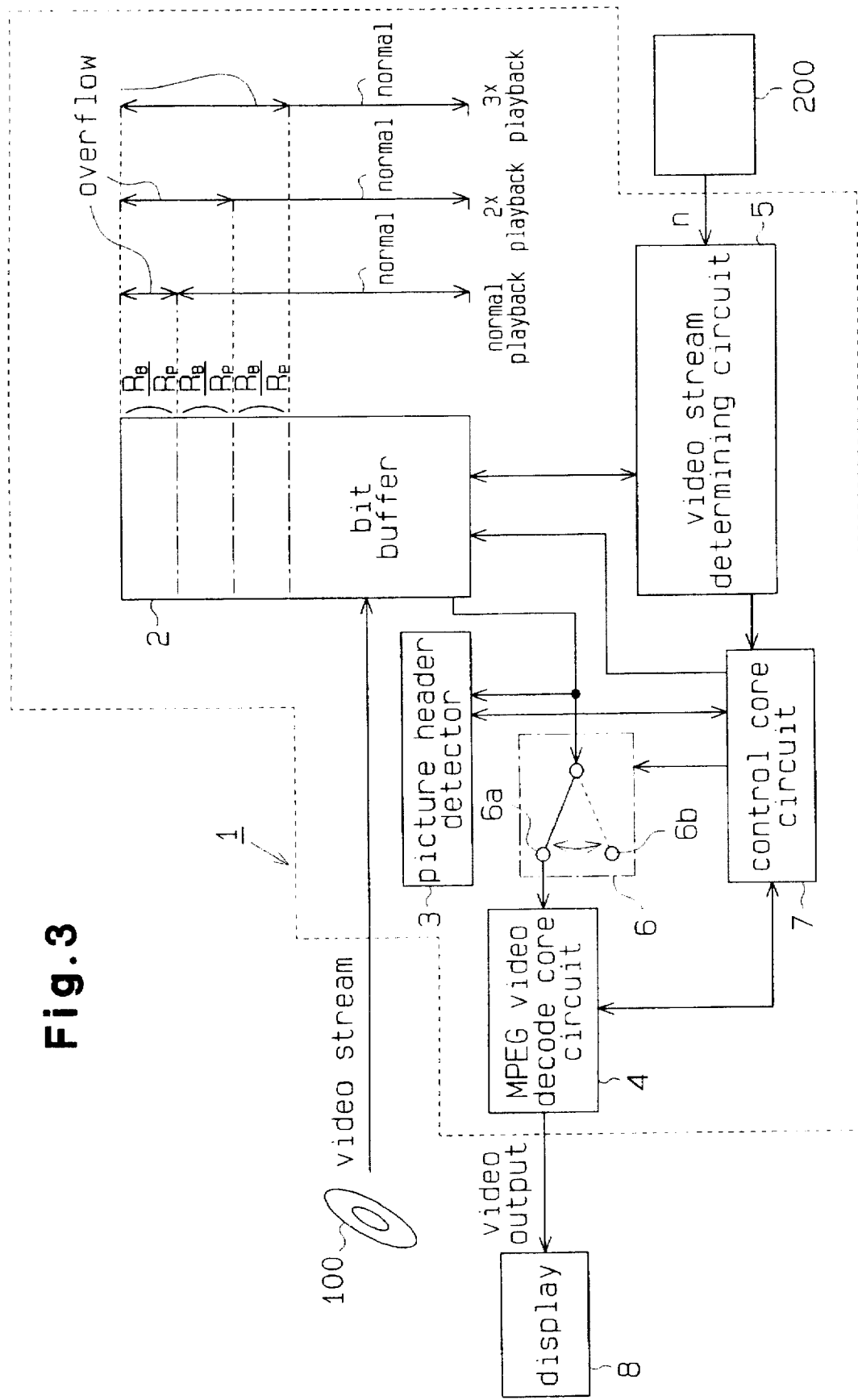
FIG. 3 is a block circuit diagram showing an MPEG video decoder according to first and second embodiments of this invention.

A first embodiment of the present invention will be now described with reference to the accompanying drawings. A video decoder according to the first embodiment has a fast playback function and conforms to the MPEG standards. As illustrated in FIG. 3, an MPEG video decoder 1 according to the first embodiment comprises a bit buffer 2, a picture header detector 3, an MPEG video decode core circuit 4, a video stream determining circuit 5, a picture skip circuit 6, and a control core circuit 7. Those circuits 3 to 7 are preferably mounted on a single large-scale integration (LSI) chip. The picture header detector 3, the video stream determining circuit 5, the picture skip circuit 6 and the control core circuit 7 form a video bit stream control circuit.

The control core circuit 7 controls the individual circuits 2 to 6. A video stream, which has been read from a recording medium 100 like a video CD by a data reader (not shown), is supplied to the bit buffer 2. The bit buffer 2 is a ring buffer equipped with RAM (Random Access Memory) having a FIFO structure for sequentially storing a video stream. The bit buffer 2 serves as a buffer memory to allow the decode core circuit 4 to decode all the pictures irrespective of the amounts of data of I, P and B-pictures.

The picture header detector 3 detects a picture header at the head of each picture included in the video stream that is stored in the bit buffer 2. The picture header defines the type as one of I-, P- and B-pictures. In accordance with a detection signal from the picture header detector 3 and a decision signal of the determining circuit 5 which will be discussed later, the control core circuit 7 controls the bit buffer 2 in such a way as to read a video stream corresponding to the proper number of pictures every frame period. The video stream of each picture read from the bit buffer 2 is transferred via the picture skip circuit 6 to the decode core circuit 4.

The decode core circuit 4 receives the video stream of each picture and decodes it in conformity to the MPEG video part to produce a video output signal picture by picture. This video output signal is supplied to a display 8 which is connected to the MPEG video decoder 1.

The picture skip circuit 6 has a first node 6a and a second node 6b and selectively switches the connection to the nodes 6a and 6b under the control of the control core circuit 7. When the picture skip circuit 6 is set to the first node 6a, pictures are transferred to the decode core circuit 4 from the bit buffer 2. When the picture skip circuit 6 is set to the second node 6b, on the other hand, pictures are not transferred to the bit buffer 2 and are skipped. As a result, a video stream to be transferred to the decode core circuit 4 is thinned in units of pictures by the picture skip circuit 6.

The video stream determining circuit 5 changes a threshold value Bthn of the occupying amount Bm of pictures (video stream) in the bit buffer 2 in accordance with a playback speed signal n which is supplied from an external input device 200, and compares the actual occupying amount Bm with the threshold value Bthn. The playback speed signal n is represented by a magnification with respect to the normal playback speed. In the 2× playback mode, for example, the magnification n=2 and the threshold value Bthn becomes Bth2. In the normal playback mode, the magnification n=1 and the threshold value Bthn becomes Bth1. When the occupying amount Bm of the bit buffer 2 is not greater than the threshold value Bthn, the determining circuit 5 determines that the bit buffer 2 is unlikely to overflow and that the occupying amount is normal. In accordance with this decision, the control core circuit 7 controls the bit buffer 2 in such a way as to read out a video stream for one picture. Further, the control core circuit 7 sets the picture skip circuit 6 to the first node 6a so that pictures are transferred to the decode core circuit 4.

When the occupying amount Bm of the bit buffer 2 exceeds the threshold value Bthn, the determining circuit 5 determines that the bit buffer 2 may overflow. In accordance with this decision, the control core circuit 7 controls the bit buffer 2 in such a manner that a video stream for the proper number of pictures is read out to set the occupying amount Bm of the bit buffer 2 smaller than the threshold value Bthn. Further, the control core circuit 7 sets the picture skip circuit 6 to the second node 6b so as to skip the proper number of pictures.

Figure 4:
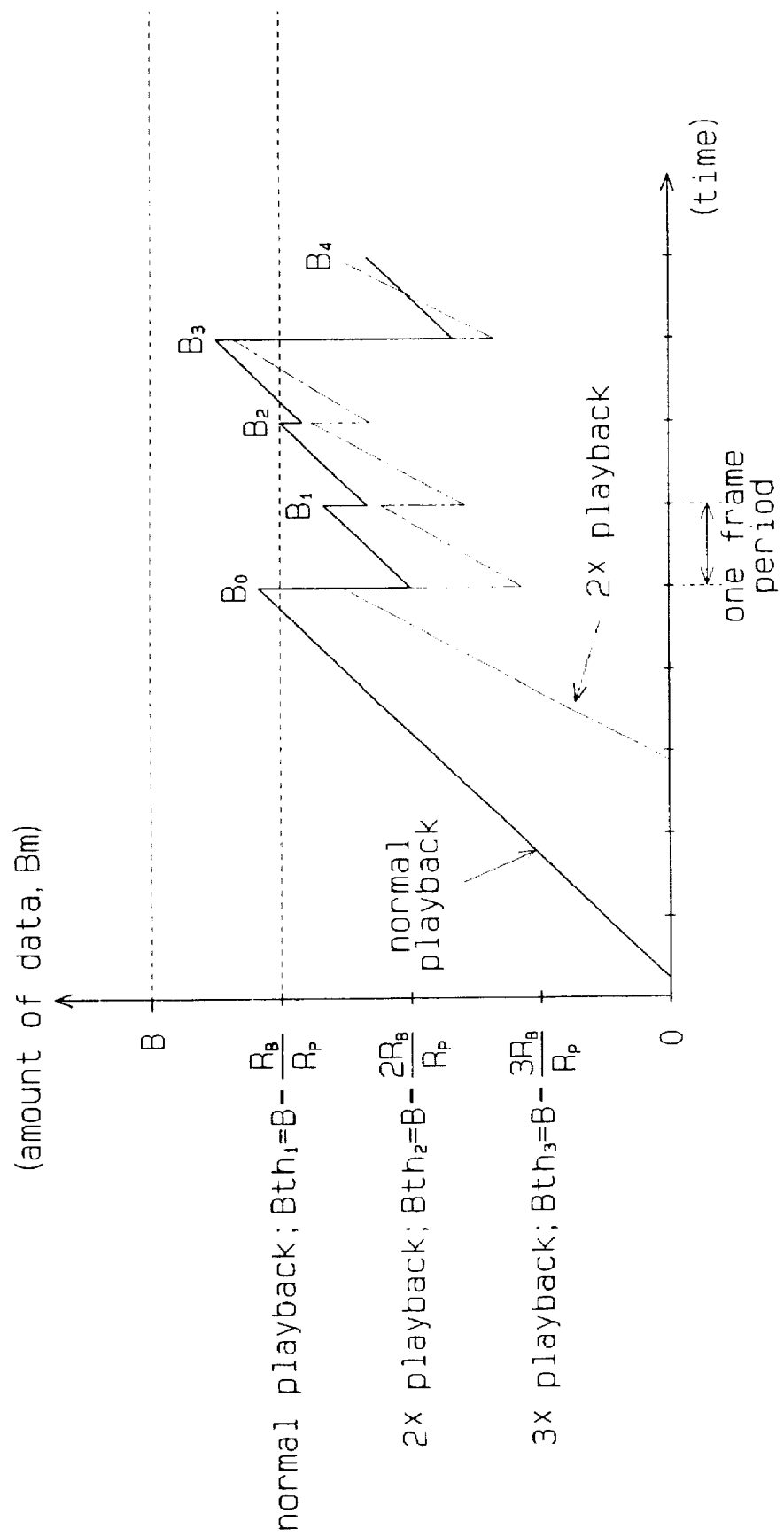
FIG. 4 is a graph showing the relationship between the occupying amount of a video stream in a bit buffer according to the first embodiment and time.

FIG. 4 is a graph showing the relationship between the occupying amount of a video stream in the bit buffer 2 in the first embodiment and time. The occupying amount Bm in the normal playback mode rises at the bit rate $R_B$ of the video stream, which represents the slope of the graph. The bit rate $R_B$, the picture rate $R_P$ and the capacity B for the MPEG video decoder 1 of this embodiment, like those for the conventional MPEG video decoder 101, are so defined as to satisfy the aforementioned equation (4), $0<Bm<B-X=B-(R_B/R_P)$. The capacity B is defined as given by the equation (2), $B=16\times1024\times VBS$. This prevents the bit buffer 2 from overflowing or underflowing even when the picture skip circuit 6 is switched to the first node 6a in the ideal condition.

The occupying amount Bm, indicated by $B_0$ to $B_4$, immediately after the continuous reading of one picture of data from the bit buffer 2 is defined based on the threshold value Bth1 so as to satisfy the following equation (5).

$$0<Bm<Bth1<B \qquad (5)$$

The threshold value Bth1 is set as expressed by an equation (6) below in association with the equation (4).

$$Bth1=B-X=B-(R_B/R_P) \qquad (6)$$

Actually, even if the capacity B is set as given by the equation (2), the bit buffer 2 may overflow in the following two cases when the picture skip circuit 6 is kept set to the first node 6a.

Case 1: The bit rate $R_B$ of a video stream read from a recording medium is not synchronized with the bit rate of the video output and the former bit rate $R_B$ is greater than the latter bit rate.

Case 2: The decode core circuit 4 does not decode a video stream in conformity with the MPEG standards.

When the occupying amount Bm of the bit buffer 2 exceeds the threshold value, first the determining circuit 5 determines that the bit buffer 2 is apt to overflow. Then, the control core circuit 7 controls the bit buffer 2 in such a manner that a video stream for the proper number of pictures is read out from the bit buffer 2 to set the occupying amount Bm smaller than the threshold value Bth1. Further, the picture skip circuit 6 is switched to the second node 6b to skip all the read pictures. Therefore, the first embodiment can prevent the bit buffer 2 from overflowing in both cases 1 and 2 in the normal playback mode.

The occupying amount Bm in the fast playback mode rises at the bit rate $n\times R_B$ of the video stream, which represents the slope of the graph. For example, the occupying amount Bm in the 2×playback mode rises along the graph whose slope is given by the bit rate $2\times R_B$. In the fast playback mode, therefore, the occupying amount Bm, indicated by $B_0$ to $B_4$, immediately after the continuous reading of one picture of data from the bit buffer 2 is defined based on the threshold value Bthn so as to satisfy an equation (7) below.

$$0<Bm<Bthn \qquad (7)$$

The threshold value Bthn is set as expressed by the following equation (8).

$$Bthn=B-n\times X=B-(n\times R_B/R_P) \qquad (8)$$

When the occupying amount Bm exceeds the threshold value Bthn in the fast playback mode, the determining circuit 5 determines that the bit buffer 2 may overflow. This may occur, for example, when the occupying amount Bm exceeds the threshold value Bth2 ($=B-(2\times R_B/R_P)$) in the 2×playback mode and when the occupying amount Bm exceeds the threshold value Bth3 ($=B-(3\times R_B/R_P)$) in the 3×playback mode. In accordance with the decision signal, the control core circuit 7 controls the bit buffer 2 in such a manner that a video stream for the proper number of pictures is read out from the bit buffer 2 and is skipped to set the occupying amount Bm smaller than the threshold value Bthn. This control can prevent the bit buffer 2 from overflowing in the case 2 in the fast playback mode. In the normal playback mode and fast playback mode, the control core circuit 7 can easily control the bit buffer 2 and the picture skip circuit 6 based on the threshold value. This design can eliminate the need for a microcomputer for the control core circuit 7. Further, the mounting of the individual circuits 3 to 7 on a single LSI chip in this embodiment contributes to reducing the manufacturing cost and making the overall apparatus compact.

The overflow of the bit buffer 2 should be avoided at any cost especially while the decode core circuit 4 is decoding an arbitrary picture. Suppose that the bit buffer 2 overflows while the decode core circuit 4 is decoding an arbitrary picture, as mentioned in the section on Related Art. Then, although some of the video stream of the picture that is being decoded still remains in the bit buffer 102, it is overwritten with a newly supplied video stream. Consequently, the remaining video stream of that picture is destroyed and lost. It therefore becomes impossible for the decode core circuit 4 to finish decoding the picture, thus disabling the production of the video output of the picture.

According to this embodiment, therefore, the determining circuit 5 checks the free space in the bit buffer 2 when the picture header detector 3 detects a picture header to determine if there is a sufficient space ($n\times X=n\times R_B/R_P$) secured. When the determining circuit 5 determines that there is insufficient space, the control core circuit 7 skips the picture read from the bit buffer 2 via the picture skip circuit 6 based on that picture header. Next, the determining circuit 5 checks the free space in the bit buffer 2 again when the picture header detector 3 detects the next picture header. The time needed for those decisions and the skipping process is considerably shorter than the time for the decoding process by the decode core circuit 4. Therefore, no problem will arise even when the decoding process starts after a sufficient space is secured in the bit buffer 2.

The reason why the free space in the bit buffer 2 is checked is that the amount of picture data is not constant.

The amount of data of one picture ranges from 0 byte to 40 bytes, and this amount becomes apparent when the decode core circuit 4 finishes the decoding. Further, the time for decoding one picture is normally about ⅓ to ¾ of one frame period though it varies in accordance with the amount of data of that picture and the operation speed of the decode core circuit 4. When the amount of data of a picture is 0 bytes, for example, the occupying amount Bm of the bit buffer 2 before the reading of this picture does not differ from that after the picture reading. Therefore, skipping the picture of 0 byte makes it impossible to avoid the overflow of the bit buffer 2. In other words, when the bit buffer 2 has enough free space for the amount of data which is supplied in one frame period, it is possible to avoid the overflow of the bit buffer 2 regardless of the amount of data of a read picture.

The amount of data of a video stream to be supplied to the bit buffer 2 in one frame period is $n \times X = n \times R^B / R_p$. The overflow of the bit buffer 2 can therefore be avoided if the bit buffer 2 has free space equal to or greater than this data amount. This free space is the capacity B of the bit buffer 2 minus the threshold value Bthn as given by the equation (8). When the occupying amount Bm is not greater than the threshold value Bthn, therefore, the determining circuit 5 determines that a sufficient free space is secured in the bit buffer 2. That is, setting the threshold value Bthn as indicated by the equation (8) can surely avoid the overflow of the bit buffer 2.

According to the first embodiment, it is determined if the bit buffer 2 is likely to overflow, before the decode core circuit 4 starts decoding an arbitrary picture. More specifically, the decision on the overflow of the bit buffer 2 is made when the picture header detector 3 detects a picture header, and it is then determined whether or not to skip the picture in accordance with the decision. This approach can prevent the video stream of a picture being transferred to the decode core circuit 4 from being interrupted during the transfer and can allow the decode core circuit 4 to decode a P-picture and a B-picture as well as an I-picture. As a result, the occurrence of frame dropping will be decreased. At the time of a fast playback two to four times faster than the normal playback, it is possible to display pictures at a rate of several frames per second. It is thus possible to attain moving pictures which show a smooth motion in the fast playback mode, and to significantly improve the picture quality.

Second Embodiment

The second embodiment of this invention will now be described with reference to FIGS. 3 through 5. An MPEG video decoder according to the second embodiment has the same general structure as that of the first embodiment. The video stream determining circuit 5 in this embodiment however uses two threshold values B2thn and B3thn, which are so set as to meet the condition given in an equation (9).

$$0 < B3thn < B2thn < B \qquad (9)$$

It is preferable that those threshold values B2thn and B3thn are set in accordance with the playback speed as in the first embodiment and also based on the result of the actual check on the quality of moving pictures to be displayed on the display 8. The determining circuit 5 compares the occupying amount Bm of the bit buffer 2 with the threshold values B2thn and B3thn and determines which one of the following three cases C1 to C3 the current case is.

Case C1 (Bm<B3thn):

When the occupying amount Bm of the bit buffer 2 does not exceed the threshold value B3thn, the determining circuit 5 determines that the bit buffer 2 is unlikely to overflow and is normal. In accordance with this decision, the control core circuit 7 controls the bit buffer 2 in such a way as to read a video stream for one picture from the bit buffer 2. Further, the control core circuit 7 switches the picture skip circuit 6 to the first node 6a to transfer the video stream of that picture to the decode core circuit 4.

Case C2 (B2thn<Bm):

When the occupying amount Bm has exceeded the threshold value B2thn, the determining circuit 5 sets a first flag as long as the picture read from the bit buffer 2 is an I- or P-picture. When and only when the first flag is set and a picture read following the I- or P-picture is a B-picture, the control core circuit 7 skips that B-picture even if the occupying amount Bm becomes smaller than the threshold value B3thn.

Case C3 (B3thn<Bm<B2thn):

When the occupying amount Bm is greater than the threshold value B3thn but is not greater than the threshold value B2thn, the determining circuit 5 sets a second flag as long as the read picture is a P-picture. When and only when the second flag is set and a picture read following the P-picture is a B-picture, the control core circuit 7 skips that B-picture even if the occupying amount Bm becomes smaller than the threshold value B3thn.

Figure 5:
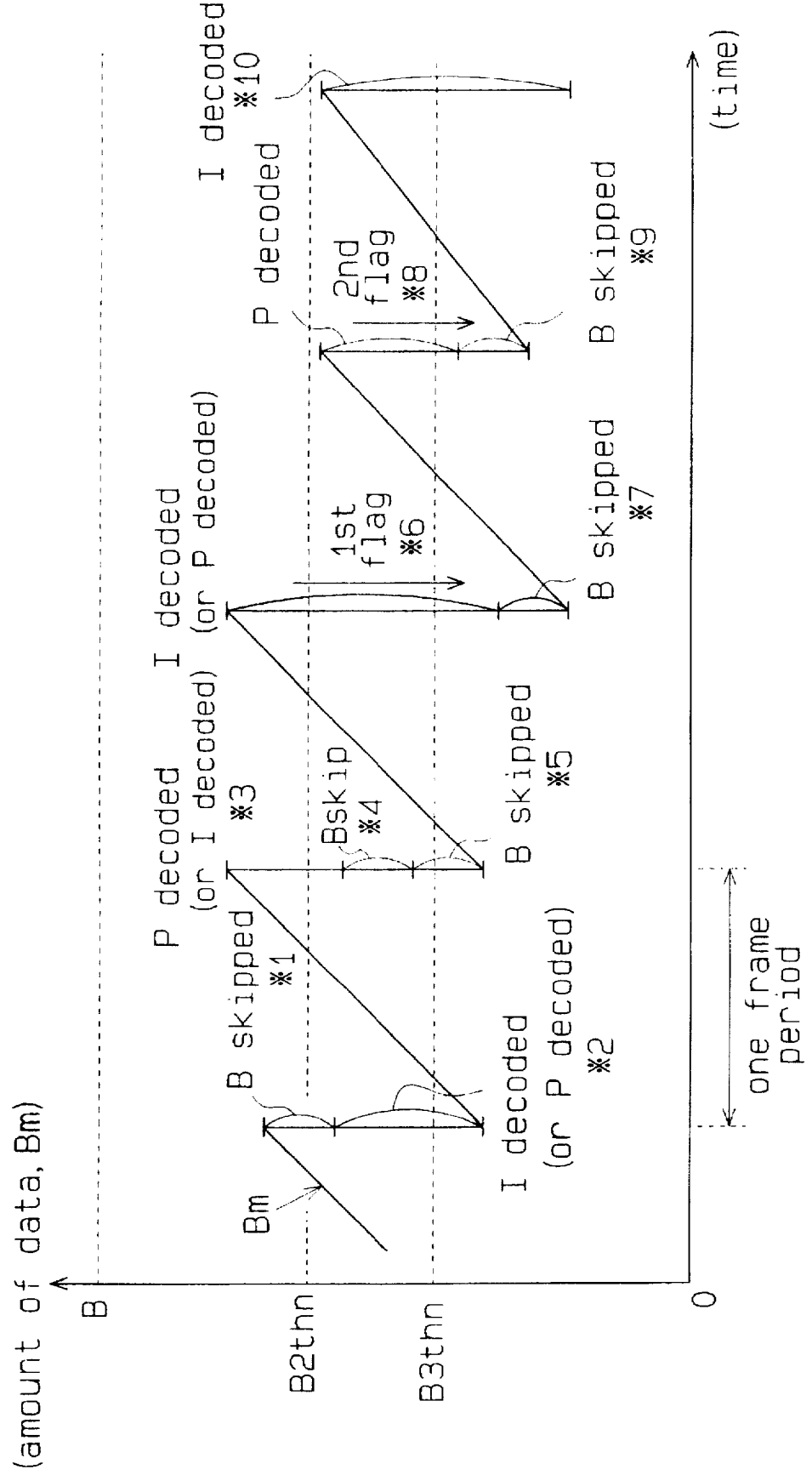
FIG. 5 is a graph showing the relationship between the occupying amount of a video stream in a bit buffer according to the second embodiment and time.

FIG. 5 is a graph showing the relationship between the occupying amount of a video stream in the bit buffer 2 according to the second embodiment and time. When the occupying amount Bm is greater than the threshold value B3thn, if it is a B-picture which has been read, this B-picture is not decoded but is skipped (see *1 in FIG. 5). When the occupying amount Bm is still greater than the threshold value B3thn even after the skipping of the B-picture, an I- or P-picture read after that B-picture is decoded (see *2).

When the occupying amount Bm is greater than the threshold value B3thn, if it is an I- or P-picture which has been read, this picture is decoded (see *3 in the diagram). When the occupying amount Bm is still greater than the threshold value B3thn even after the decoding of the I- or P-picture, a B-picture read after that I- or P-picture is not decoded but is skipped (see *4). The skipping of this B-picture is repeated until the occupying amount Bm becomes smaller than the threshold value B3thn (see *5).

The reason why a B-picture is skipped with priority over an I- or P-picture is because the data of a B-picture produced by the bidirectional prediction has a lower significance than the data of I- and P-pictures. The skipping of a B-picture with priority over an I- or P-picture permits I- and P-pictures to be decoded as much as possible. Therefore, the number of frames that are dropped from moving pictures to be displayed becomes less than that in the first embodiment. Accordingly, it is possible to attain moving pictures which show a smoother motion in the fast playback mode with a higher picture quality.

When the occupying amount Bm becomes greater than the threshold value B2thn, if it is an I- or P-picture which has been read, this picture is decoded and the determining circuit 5 sets the first flag (see *6 in the diagram). When the first flag is set and a B-picture is read after the I- or P-picture, this B-picture is skipped even if the occupying amount Bm becomes smaller than the threshold value B3thn (see *7). The previous skipping of the B-picture that is read after an I- or P-picture can secure a greater free space in the bit buffer 2 to prevent the overflow thereof.

When the occupying amount Bm becomes greater than the threshold value B3thn but is smaller than the threshold value B2thn, if it is a P-picture which has been read, this picture is decoded and the determining circuit 5 sets the second flag (see *8 in the diagram). When the second flag is set and a B-picture is read after the P-picture, this B-picture is skipped even if the occupying amount Bm becomes smaller than the threshold value B3thn (see *9). The previous skipping of the B-picture that is read after a P-picture can reduce the occupying amount Bm as much as possible to prevent the bit buffer 2 from overflowing. This overflow prevention scheme avoids overflow of the bit buffer 2.

When the occupying amount Bm becomes greater than the threshold value B3thn but is smaller than the threshold value B2thn, if it is an I-picture which has been read, this picture is decoded and the determining circuit 5 does not set the second flag (see *10 in the diagram). When the second flag is not set and when the occupying amount Bm is smaller than the threshold value B3thn, a B-picture read after the I-picture is decoded without being skipped.

The first and second flags are set in the above-described manner in order to make the condition for skipping a B-picture after the reading of an I-picture different from the condition for skipping a B-picture after the reading of a P-picture. This will be discussed below more specifically. The amount of data of an I-picture is two to three times that of a P-picture. Thus, the degree of the reduction of the occupying amount Bm after the reading of an I-picture is greater than that after the reading of a P-picture. In other words, the probability of the overflow of the bit buffer 2 after the reading of an I-picture is smaller than that after the reading of a P-picture. In this respect, the reference value or the threshold value B2thn for setting the first flag in association with an I-picture is set higher than the reference value or the threshold value B3thn for setting the second flag in association with a P-picture. Accordingly, the condition for skipping a B-picture after the reading of an I-picture becomes more relaxed than the skipping condition after the reading of a P-picture. Even if the occupying amount Bm is smaller than the threshold value B3thn, the number of B-pictures which are to be skipped unnecessarily for the prevention of the overflow of the bit buffer 2 becomes smaller. In other words, the number of B-pictures to be decoded is increased.

The following shows the results of a simulation conducted in the fast playback mode according to the second embodiment. A1 and A2 indicate the types of the GOP structure of a video stream read from a recording medium.

A1: IBPBPBPBP

A2: IBBPBBPBBPBBPBBIBP

[1] In 2× playback mode: For the type A1, all of I- and P-pictures are decodable so that moving pictures are displayed at a full rate of 30 frames per second. For the type A2, all of I- and P-pictures and some of B-pictures are decodable so that moving pictures are displayed at a rate of 25 or more frames per second.

[2] In 4× playback mode: For both the types A1 and A2, an I-picture and the subsequent three to four P-pictures are decodable so that moving pictures are displayed at a rate of 15 or more frames per second.

Third Embodiment

The third embodiment of the invention will be now described with reference to FIG. 6. Like or same reference numerals or symbols are given to the components of the third embodiment which are identical to those of the first embodiment, in order to avoid repeating their detailed descriptions.

Figure 6:
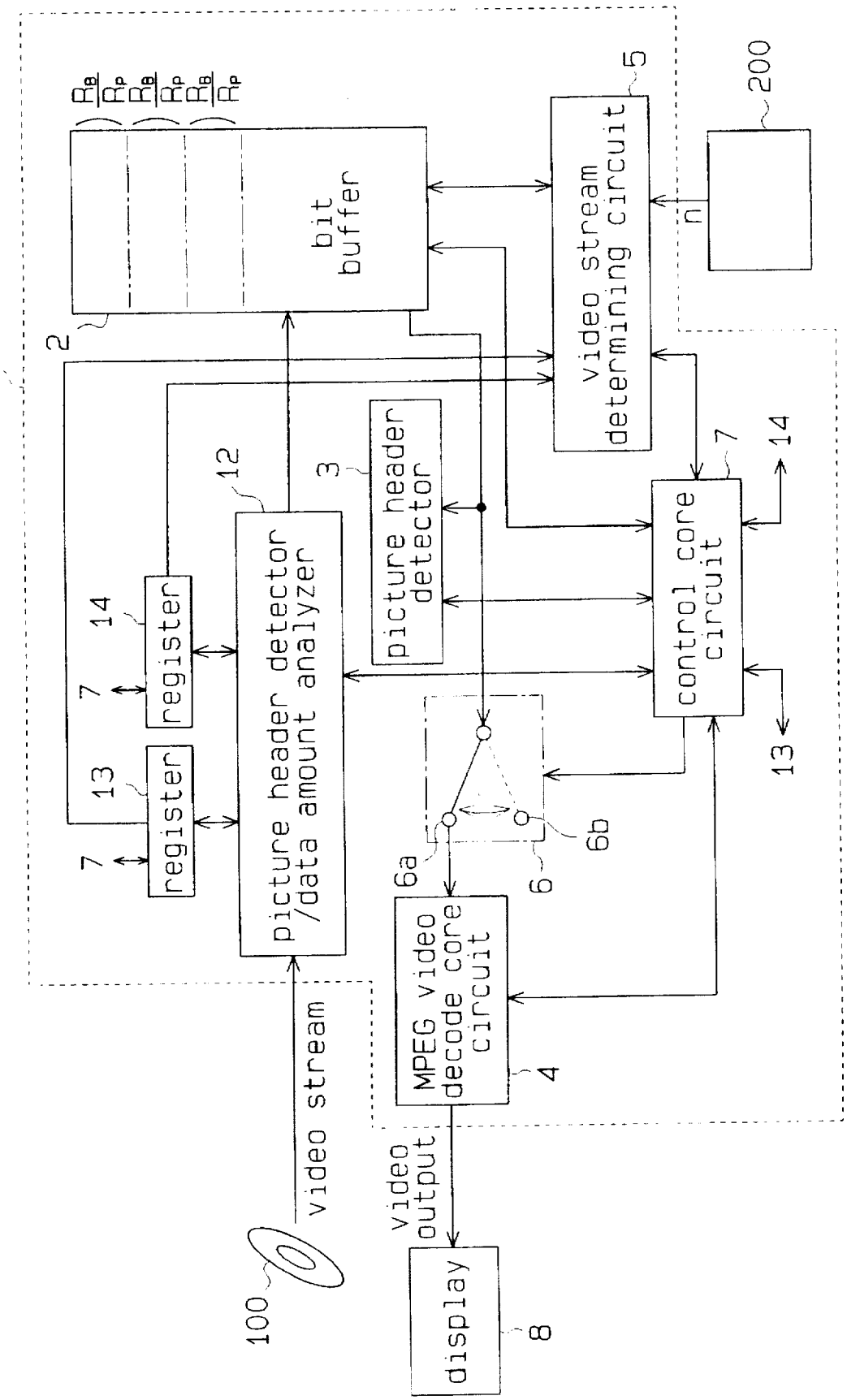
FIG. 6 is a block circuit diagram showing an MPEG video decoder according to a third embodiment of this invention.

FIG. 6 illustrates an MPEG video decoder 11 according to this embodiment which has special playback functions including fast playback, slow playback and frame-by-frame advance playback. The MPEG video decoder 11 comprises a picture header detector/data amount analyzer 12 and first and second registers 13 and 14 in addition to the bit buffer 2, the picture header detector 3, the MPEG video decode core circuit 4, the video stream determining circuit 5, the picture skip circuit 6, and the control core circuit 7. Those circuits 3 to 7 and 12 to 14 are mounted on a single LSI chip.

The control core circuit 7 controls the individual circuits 2 to 6 and 12 to 14. A video stream read from a recording medium 100 such as a video CD is sent via the picture header detector/data amount analyzer 12 to the bit buffer 2. The analyzer 12 has the following two functions:

(1) To detect a picture header located at the head of each picture included in a video stream, and determine the type (I, P or B) of each picture based on that picture header.

(2) To analyze the amount of data of each picture based on the detected picture header.

The first and second registers 13 and 14 each constitute a RAM having a FIFO structure. The first register 13 sequentially stores the picture headers detected by the analyzer 12. Consequently, the GOP structure of a video stream stored in the bit buffer 2 is registered in the first register 13. The second register 14 sequentially stores information on the amount of data of each picture analyzed by the analyzer 12.

The video stream determining circuit 5 has the following two functions:

(1) To compare the occupying amount Bm of the bit buffer 2 with the threshold values B3thn and B2thn to determine which of the above-described cases C1 to C3 the current case is.

(2) To select the type of a picture to be skipped based on the GOP structure registered in the first register 13, the amount of data of each picture registered in the second register 14 and the result of the decision in the paragraph (1).

According to the third embodiment, unlike the first and second embodiments, before a video stream is supplied to the bit buffer 2, the analyzer 12 finds out its GOP structure and the amount of data of each picture. This feature makes it possible to decide if the bit buffer 2 is likely to overflow before a video stream is supplied to the bit buffer 2. It is therefore possible to select the optimal type of a picture to be skipped, based on the GOP structure and the amount of data of each picture. This can prevent the unnecessary skipping of B-pictures, for example. That is, the number of B-pictures to be supplied to the decode core circuit 4 increases while preventing the bit buffer 2 from overflowing. Accordingly, it is possible to attain moving pictures which show a smooth motion in the fast playback mode and thus improve the picture quality.

Further, the control core circuit 7 will know the number of pictures to be stored in the bit buffer 2 and the amount of data of each picture to determine the precise occupying amount Bm of the bit buffer 2. The control core circuit 7 can also determine the accurate degree of reduction of the occupying amount Bm after the reading of an arbitrary picture. For instance, in the slow playback and the frame-by-frame advance playback, the control core circuit 7 monitors the occupying amount Bm and reads a video stream from the recording medium 100 only when the bit buffer 2 is more likely to overflow or underflow. In this manner, the number of pictures to be read from the bit buffer 2 per unit time is reduced, thus decreasing the number of frames of moving pictures which are presented on the display 8. It thus becomes possible to reduce the number of operations of the driving unit which serves to read a video stream from the recording medium. This can result in the simplified control of the driving unit for the optical pickup of a video CD player which uses a video CD, for example, as the recording medium 100. It is also possible to reduce the mechanical load on the driving unit and the occurrence of failure thereof.

Fourth Embodiment

Figure 7:
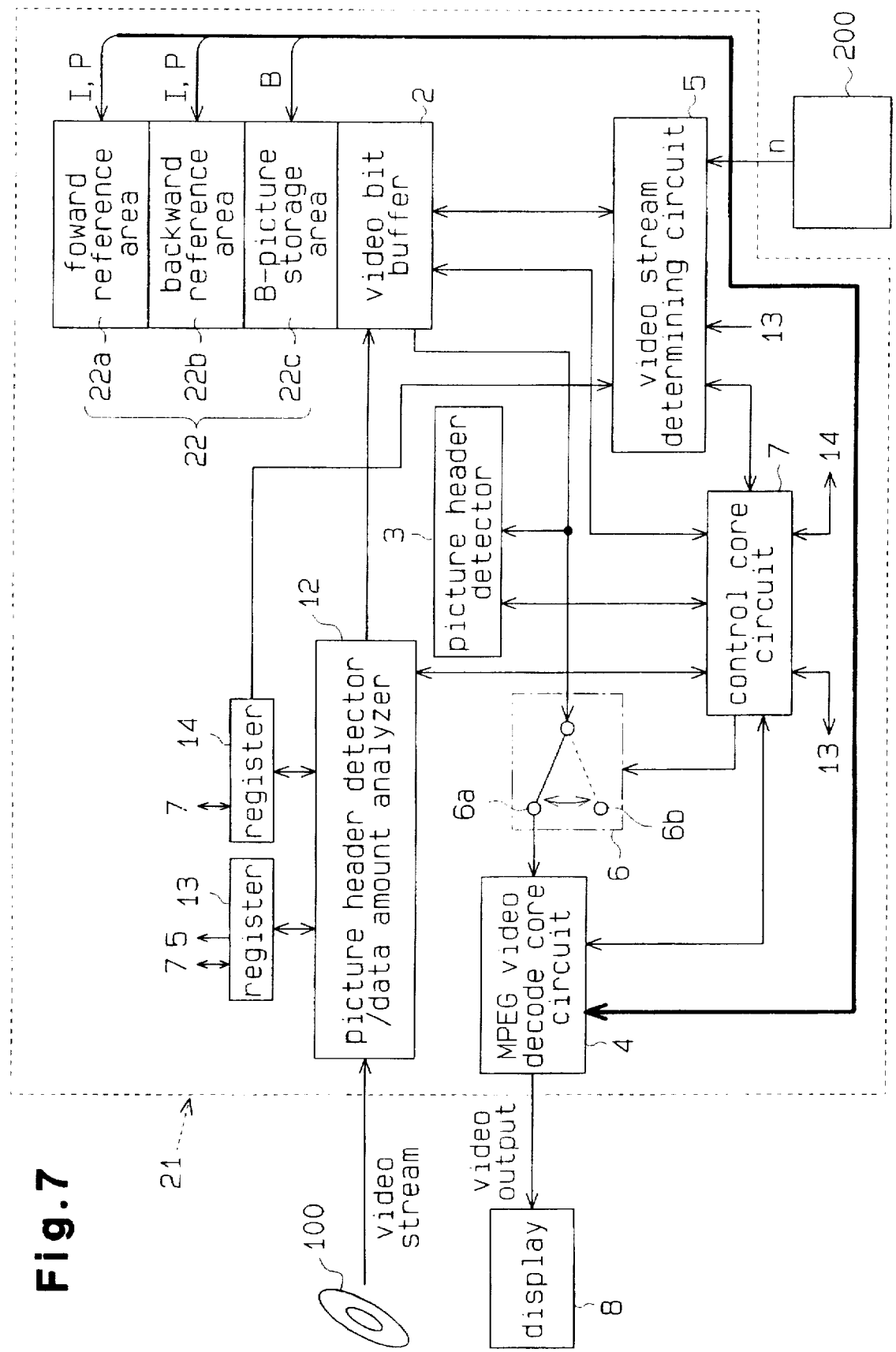
FIG. 7 is a block circuit diagram showing an MPEG video decoder according to fourth and fifth embodiments of the invention.

The fourth embodiment of the invention will be now described with reference to FIG. 7. Like or same reference numerals or symbols are given to the components of this embodiment which are identical to those of the third embodiment, in order to avoid repeating their detailed descriptions. FIG. 7 illustrates an MPEG video decoder 21 which has special playback functions. The MPEG video decoder 21 comprises a frame buffer 22 in addition to the bit buffer 2, the picture header detector 3, the MPEG video decode core circuit 4, the video stream determining circuit 5, the picture skip circuit 6, the control core circuit 7, the picture header detector/data amount analyzer 12 and first and second registers 13 and 14.

The control core circuit 7 controls the individual circuits 2 to 6, 12 to 14 and 22. The frame buffer 22, which shares a single RAM with the bit-buffer 2, has three storage areas: a forward reference area 22a, a backward reference area 22b and a B-picture storage area 22c. Those areas 22a to 22c are called planes. The arrangement of the frame buffer 22 and the bit buffer 2 in a single RAM reduces the number of necessary components and thus contributes to reducing the cost of the MPEG video decoder 21.

Decoded data (or video outputs) of the individual pictures, produced by the decode core circuit 4, are transferred to the associated areas 22a to 22c. The decoded data of the individual pictures read from the areas 22a–22c are transferred to the decode core circuit 4. The forward reference area 22a stores the decoded data of a future I- or P-picture which is used in the backward prediction that is executed by the decode core circuit 4. The backward reference area 22b stores the decoded data of an old I- or P-picture which is used in the forward prediction that is executed by the decode core circuit 4. The B-picture storage area 22c stores the decoded data of a B-picture. Decoded data stored in one of the areas 22a–22c is output to the display 8.

The decoded I- or P-picture stored in the forward reference area 22a and the backward reference area 22b is used as basic data for the forward prediction decoding or backward prediction decoding. For this purpose, the decoded I- or P-picture is kept stored in the associated storage area until the necessary prediction decoding process is completed and that picture becomes no longer necessary. The decoded B-picture is not used as the basic data, and becomes unnecessary when it is supplied to the display 8.

In the case where an MPEG video decoder and an MPEG audio decoder are mounted on a single LSI chip, an audio bit buffer for the MPEG audio decoder may be separately arranged together with the frame buffer 22 and the video bit buffer 2 in one RAM. For instance, a 4M DRAM for a video CD has a capacity for the video bit buffer 2 of 52 Kbytes, a capacity for the areas 22a to 22c each of 148.5 Kbytes, a capacity for the audio bit buffer of 6.5 Kbytes, and a capacity for the user area of 8 Kbytes. The user area is used as a sector buffer as specified in, for example, the video CD v2.0 standards.

Because moving pictures which show a sufficiently smooth motion can be attained simply by using the decoded data of I- and P-pictures in a fast playback mode as fast as or faster than 4× fast playback, B-pictures are unnecessary and can all be skipped. Because moving pictures which show a sufficiently smooth motion can be attained simply by using the decoded data of I-pictures in a fast playback mode as fast as or faster than 8× fast playback, P- and B-pictures become unnecessary and can all be skipped. It is apparent that in a fast playback mode as fast as or faster than 4× fast playback, the B-picture storage area 22c becomes unnecessary.

In the forth embodiment, therefore, the B-picture storage area 22c which is unnecessary in a fast playback mode can be used to supplement the bit buffer 2. This approach allows the storage area 22c to be used as an expansion memory for the bit buffer 2. For the aforementioned 4M DRAM, therefore, the capacity of the bit buffer 2 can be increased to about 200 Kbytes (=52 Kbytes (the capacity of the bit buffer 2) +148.5 Kbytes (the capacity of the B-picture storage area 22c)) which is approximately four times the capacity of the conventional bit buffer. Through the simulation in a fast playback mode using the bit buffer 2 which has such an expanded capacity, it is confirmed that moving pictures showing a smooth motion can be attained up to the 30× playback speed. The expansion of the capacity of the bit buffer 2 can also prevent the bit buffer 2 from overflowing in the fast playback mode as fast as or faster than the 4× playback speed.

Fifth Embodiment

The fifth embodiment of the invention will now be described with reference to FIGS. 7, 8A, 8B and 9. An MPEG video decoder according to the fifth embodiment has the same structure as the fourth embodiment. The decode core circuit 4 decodes two I- or P-pictures in conformity to the MPEG video part in a one frame period, and produces two video outputs. The decode core circuit 4 supplies only one of the two video outputs produced in one frame period, namely the second video output obtained by the later decoding, not the first video output obtained by the previous decoding, to the display 8. The first video output is used as intermediate data for the forward prediction.

As mentioned in the section on the fourth embodiment, the B-picture storage area 22c in the frame buffer 22 is unnecessary. According to this embodiment, therefore, the control core circuit 7 controls the decode core circuit 4 and the frame buffer 22 so as to store the first video output to this storage area 22c. This makes it unnecessary to provide a frame buffer for the storage of the first video output as separate from the frame buffer 22.

Figure 8A:
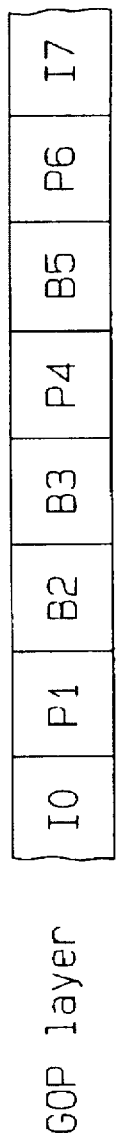
FIG. 8A is a diagram for explaining the GOP structure of a video stream and FIG. 8B is a diagram for explaining pictures to be processed every one frame period.
Figure 8B:
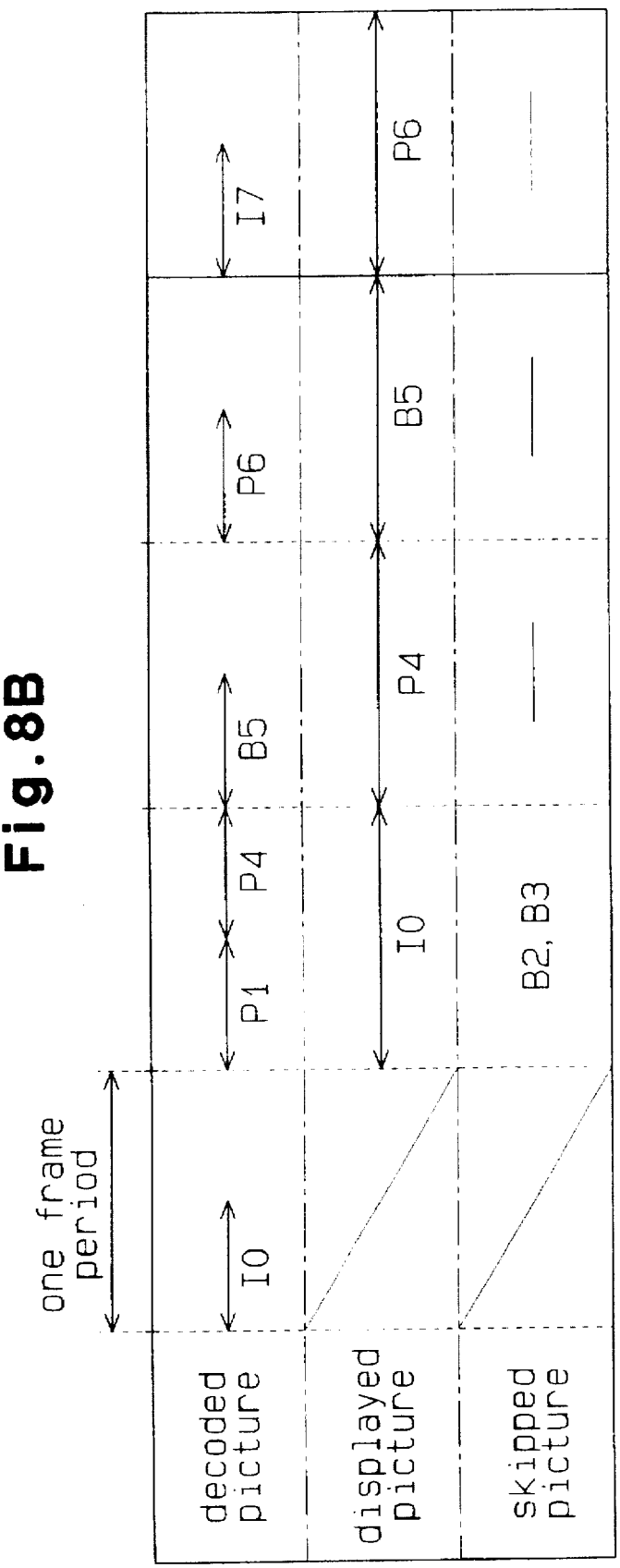

The operation of the fifth embodiment will be now described with reference to FIGS. 8A, 8B and 9. It is assumed that a video stream with the GOP layer (I, P, B, B, P, B, P, I) as shown in FIG. 8A has been read from the recording medium 100. FIG. 8B shows the pictures to be decoded by the decode core circuit 4, the pictures to be displayed on the display 8 and the pictures to be skipped via the picture skip circuit 6 in each one frame period.

FIG. 9 presents a graph showing the relationship between the occupying amount Bm of the bit buffer 2 and the time in association with what is shown in FIGS. 8A and 8B. After an I-picture I0 is decoded, a P-picture Pi is read from the bit buffer 2 and is decoded. When the occupying amount Bm is greater than the threshold value B3thn although the P-picture P1 has been read out, two B-pictures B2 and B3, read out following the P-picture P1, are not decoded but are skipped. When the occupying amount Bm is still greater than the threshold value B3thn, a P-picture P4 read out next is decoded. At this time, the previously decoded P-picture P1 (or the first video output) is not displayed on the display 8 and is used as intermediate data to produce the video output of the P-picture P4 through the forward prediction. Thus, only the decoded P-picture P4 (or the second video output) is displayed. Those processes are executed in one frame period. In the next one frame period, a B-picture B5 is decoded and is displayed.

Therefore, the number of decodable P-pictures increases while preventing the bit buffer 2 from overflowing. Accordingly, the number of decodable B-pictures also increases. It is therefore possible to attain moving pictures which show a smoother motion in the fast playback mode and to further improve the picture quality.

Sixth Embodiment

Figure 10:
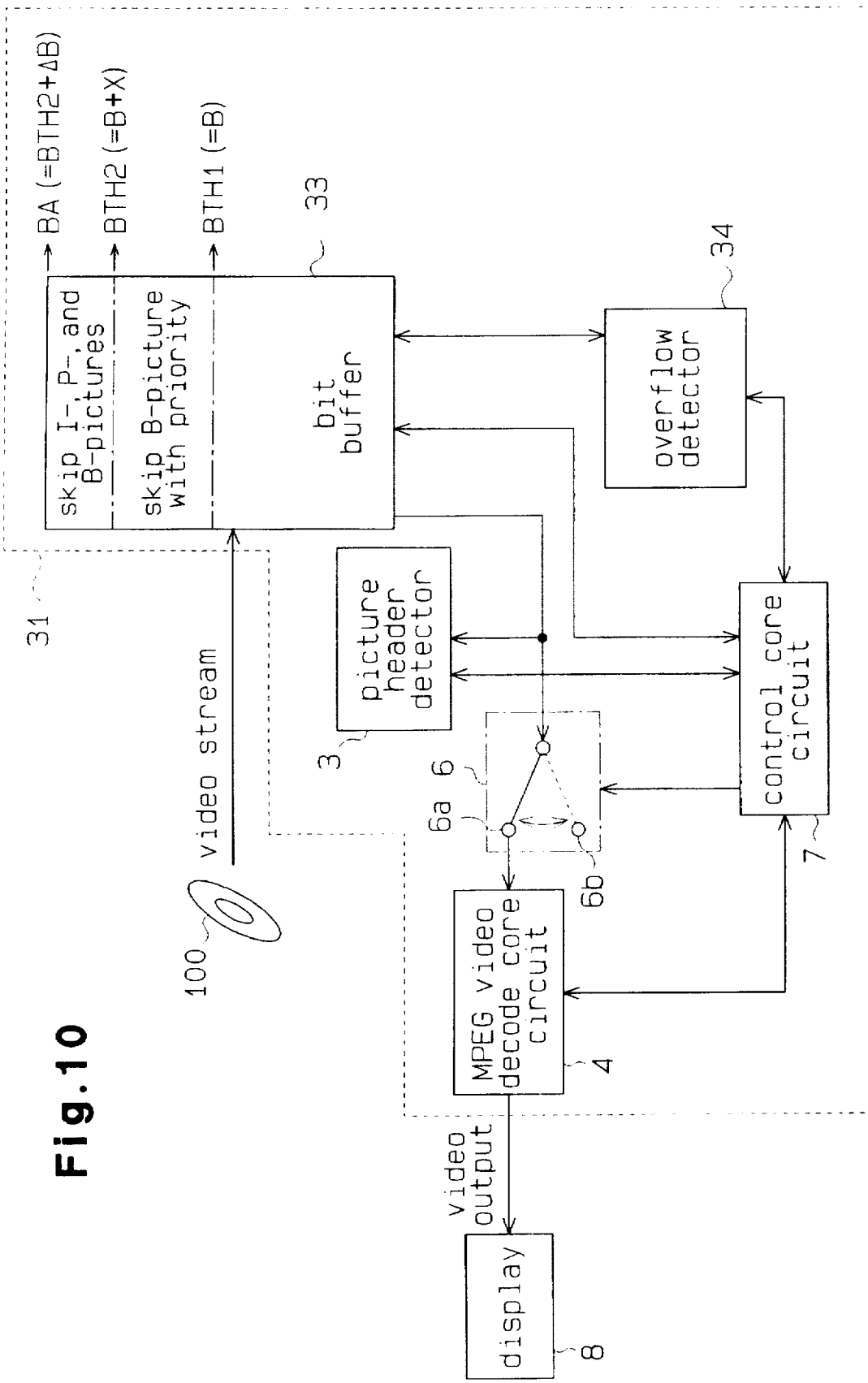
FIG. 10 is a block circuit diagram showing an MPEG video decoder according to a sixth embodiment of the invention.
Figure 11:
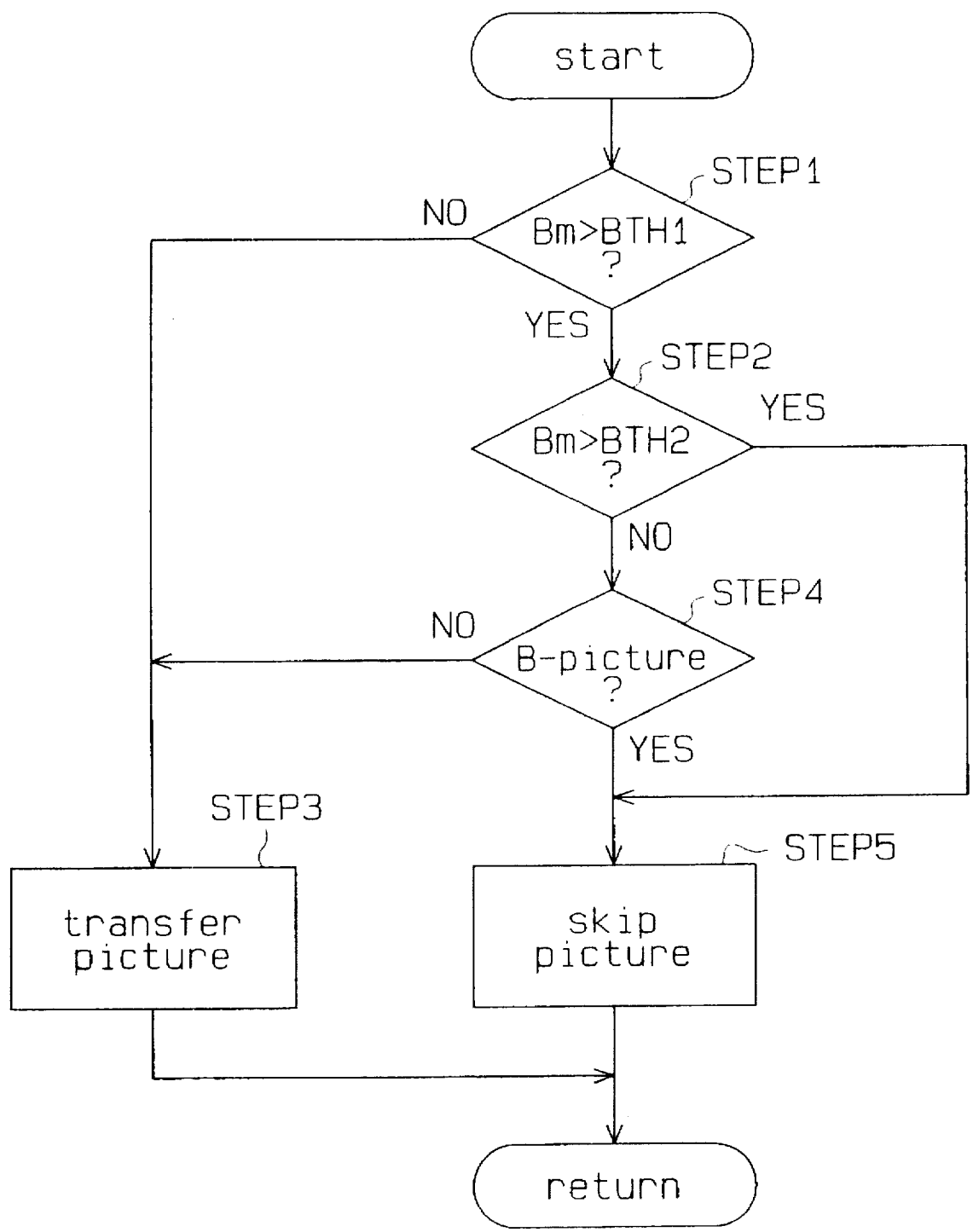
FIG. 11 is a flowchart for explaining the operation of the sixth embodiment.

The sixth embodiment of the invention will now be described with reference to FIGS. 10 and 11. Like or same reference numerals or symbols are given to the components of this embodiment which are identical to those of the first embodiment, so that repeating their detailed descriptions can be avoided. FIG. 10 shows the block circuit of an MPEG video decoder 31 which has special playback functions. The MPEG video decoder 31 comprises the picture header detector 3, the MPEG video decode core circuit 4, the picture skip circuit 6, the control core circuit 7, a bit buffer 33 and an overflow detector 34.

The control core circuit 7 controls the individual circuits 3, 4, 6, 33 and 34. The bit buffer 33 consists of RAM which has an FIFO structure, and sequentially stores a video stream. The capacity (buffer size) BA of the bit buffer 33 is set as given by the following equation (10).

$$BA = B + X + AB \quad (10)$$

where B is the capacity defined by the equation (2), 16×1024×VBS, as given in the section on Related Art, X is the amount of data that is defined by the equation (3), $R_B/R_P$, as also given in the section on Related Art, and AB is the proper margin. For a video CD, for example, the capacity B and the amount of data X are defined to be 46 Kbytes and 6 Kbytes, respectively. The margin AB is set to approximately 2 Kbytes. The capacity of the bit buffer 33 is therefore set to approximately 54 Kbytes (=B+X+AB=46 K+6K+2K).

The overflow detector 34 detects the occupying amount Bm of the video stream in the bit buffer 33, and compares that occupying amount Bm with a first threshold value BTH1 and a second threshold value BTH2. The first threshold value BTH1 is set to the same value as the capacity B. The second threshold value BTH2 is set to a value obtained by adding the amount of data, X, to the capacity B.

The operation of the video decoder 31 will be now described with reference to the flowchart illustrated in FIG. 11. When the overflow detector 5 determines in step 1 that the occupying amount Bm is greater than the first threshold value BTH1, the flow proceeds to step 2. When the decision in step 1 is otherwise, the flow moves to step 3. When the overflow detector 5 determines in step 2 that the occupying amount Bm is greater than the second threshold value BTH2, the flow proceeds to step 5. When the decision in step 2 is otherwise, the flow advances to step 4.

When the type of a picture determined by the picture header detector 3 is a B-picture in step 4, the flow proceeds to step 5. When that picture is an I-picture or a P-picture, the flow goes to step 3. In step 5, the picture skip circuit 6 skips the picture after which the flow returns to step 1. In step 3, the picture skip circuit 6 transfers the picture to the decode core circuit 4 after which the flow returns to step 1.

According to the sixth embodiment, as apparent from the above, when the occupying amount Bm does not exceed the first threshold value BTH1, the picture which has been read from the bit buffer 33 is transferred to the decode core circuit 4 regardless of its type. When the occupying amount Bm lies between the first and second threshold values BTH1 and BTH2, an I- or P-picture is transferred to the decode core circuit 4 while a B-picture is skipped with priority over the I- or P-picture. The skipping of a B-picture with priority over the I- or P-picture suppresses the possibility of the occurrence of the overflow of the bit buffer 33. This skipping of a B-picture does not affect the continuous data decoding by the decode core circuit 4.

When the occupying amount Bm becomes greater than the second threshold value BTH2, I, P and B-pictures are skipped. As a result, the occupying amount Bm of the bit buffer 33 decreases so that the overflow of the bit buffer 33 will not occur.

Since the capacity BA of the bit buffer 33 includes the margin ΔB in this embodiment, it becomes more unlikely that the bit buffer 33 would overflow. The greater the margin ΔB is, the less likely it becomes that the bit buffer 33 would overflow. In this case, however, the capacity BA increases, thus impairing the cost efficiency. It is therefore preferable that the margin ΔB be set to the proper value obtained from actually conducted experiments of processing multifarious video streams.

Seventh Embodiment

Figure 12:
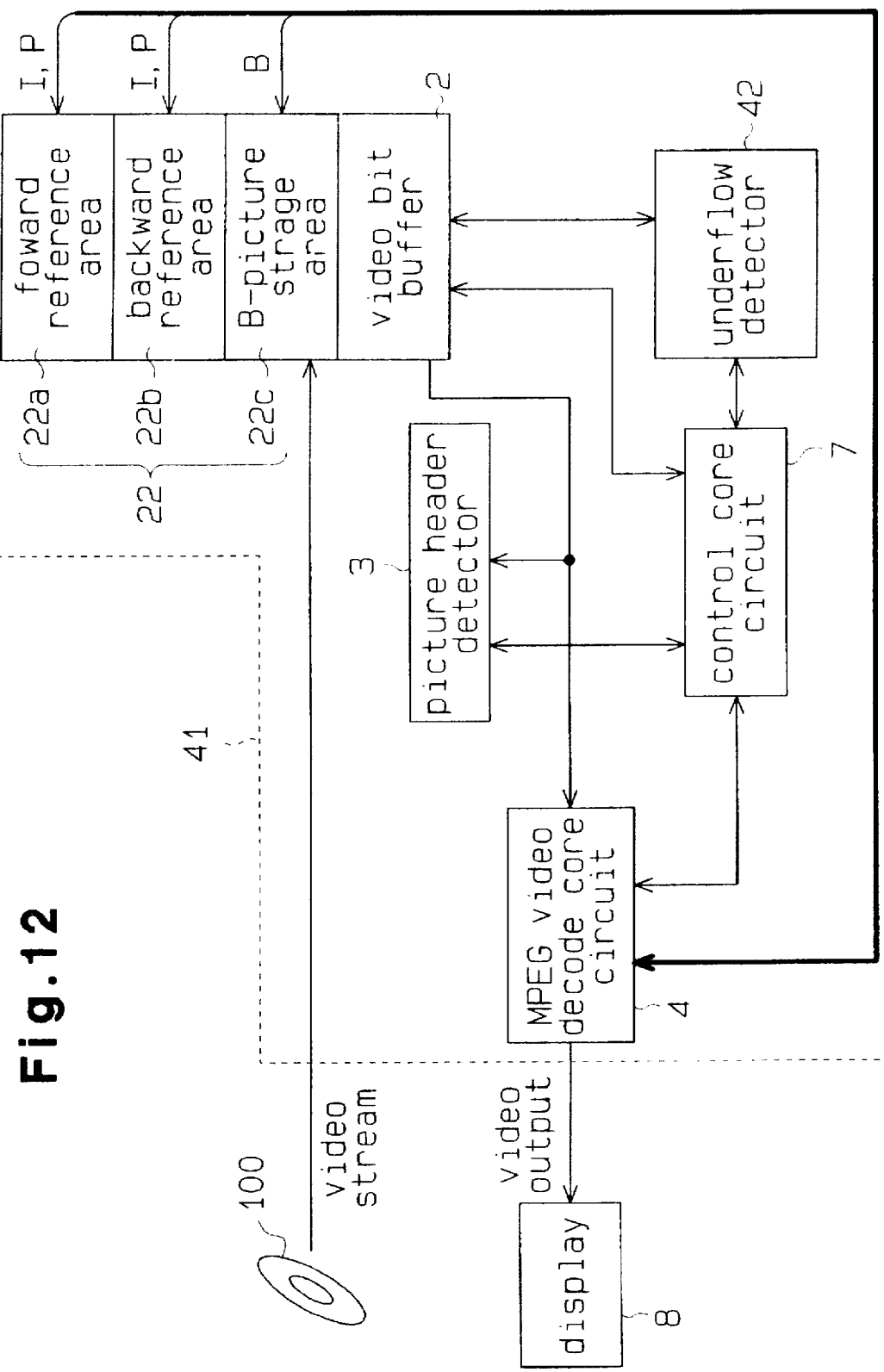
FIG. 12 is a block circuit diagram showing an MPEG video decoder according to a seventh embodiment of the invention.
Figure 13:
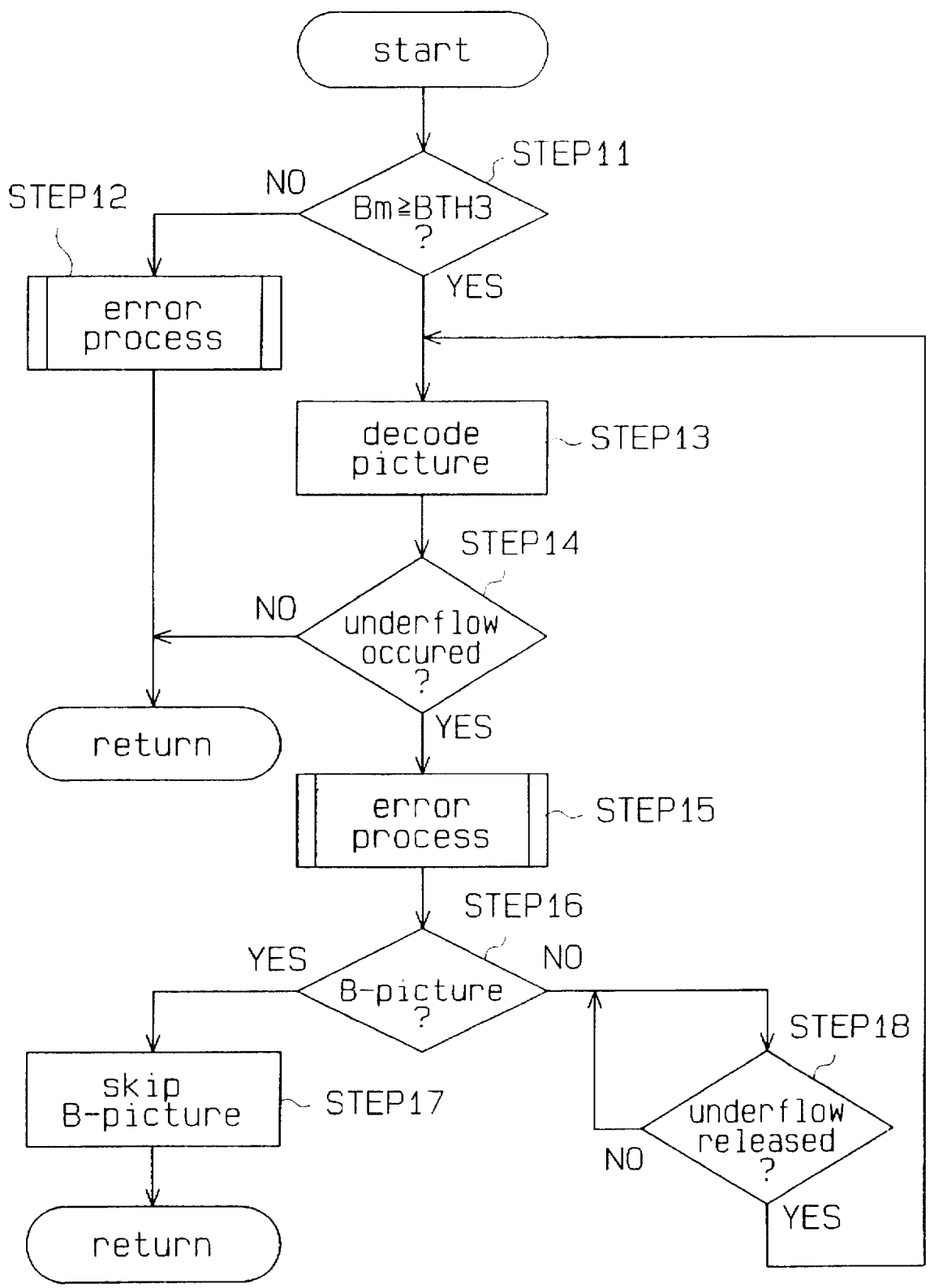
FIG. 13 is a flowchart for explaining the operation of the seventh embodiment.

The seventh embodiment of the invention will be now described with reference to FIGS. 12 and 13. FIG. 12 shows the block circuit of an MPEG video decoder 41 according to this embodiment. The MPEG video decoder 41 includes the bit buffer 2, the picture header detector 3, the decode core circuit 4, the control core circuit 7, the frame buffer 22 and an underflow detector 42. The picture header detector 3 and the decode core circuit 4 have the same structures as those of the first embodiment. The bit buffer 2 and the frame buffer 22 have the same structures as those of the fourth embodiment.

The underflow detector 22 compares the occupying amount Bm of the bit buffer 2 with a threshold value BTH3 and detects whether or not the bit buffer 2 is underflowing. The threshold value BTH3 is set to a value obtained by multiplying the bit rate $R_B$ by a vbv(video buffering verifier) delay value VD. This vbv delay value VD is defined by a picture header.

The control core circuit 7 controls the decode core circuit 4 and the bit buffer 2 based on the type of a picture read from the bit buffer 2 and the results of the comparison and detection by the underflow detector 12.

The operation of the MPEG video decoder 41 will now be discussed with reference to the flowchart shown in FIG. 13. When the underflow detector 42 determines in step 11 that the occupying amount Bm is smaller than the threshold value BTH3, the flow moves to step 12. When the decision in step 11 is otherwise, the flow jumps to step 13. An occupying amount Bm that is smaller than the threshold value BTH3 indicates a high possibility that the bit buffer 2 would underflow when a picture is read from the bit buffer 2.

An error process is executed in step 12. More specifically, the control core circuit 7 stops reading pictures from the bit buffer 2 and, at the same time, controls the decode core circuit 4 in such a way as to repeatedly output the picture which was decoded before the picture reading has stopped, and not to output the picture which has undergone the decoding upon stopping of the picture reading. Then, the flow returns to step 11. This error process increases the occupying amount Bm to make it less likely that the bit buffer 2 would underflow.

In step 13, the next picture is read from the bit buffer 2 and it is decoded by the decode core circuit 4, yielding a video output. The flow then proceeds to step 14.

When the underflow detector 42 determines in step 14 that the bit buffer 2 is not underflowing, the flow returns to step 11. When it is determined that the underflow has occurred, on the other hand, the flow moves to step 15. In other words, the flow returns to step 11 when the decoding of one picture by the decode core circuit 4 is terminated properly, and the flow proceeds to step 15 when the bit buffer 2 underflows during the decoding of one picture.

In step 15, an error process similar to the one in step 12 is performed, after which the flow proceeds to step 16. The execution of the error processing even upon the occurrence of the underflow allows the decode core circuit 4 to keep supplying a video output to the display 8, so that moving pictures are kept displayed on the screen of the display 8.

When the picture header detector 3 determines in step 16 that the read picture is a B-picture, the flow goes to step 17. When the read picture is an I-picture or a P-picture, the flow moves to step 18. In step 17, the B-picture which has been undergoing the decoding process by the decode core circuit 4 is skipped. The skipping of the B-picture does not affect the continuous decoding process by the decode core circuit 4. After the picture skipping, the flow returns to step 11.

When the underflow detector 42 determines in step 18 that the underflow of the bit buffer 2 has been released, the flow returns to step 13. The underflow is released when a video stream is transferred to the bit buffer 2 from the data reader (not shown). After the releasing of the underflow, the decoding of the I- or P-picture which has been in progress upon occurrence of the underflow is resumed in step 13. This can allow I- or P-pictures having a high significance to be displayed as much as possible, and can provide moving pictures which drop fewer frames and show a smoother motion. The quality of the attained moving pictures is therefore improved.

According to the seventh embodiment, the frame buffer 22 and the bit buffer 2 are provided in a single 4M DRAM. Further, the frame buffer 22 has three storage areas, namely the forward reference area 22a, the backward reference area 22b and the B-picture storage area 22c. The first B-picture decoded by the decode core circuit 4 is transferred to the B-picture storage area 22c, and at the same time, the second B-picture already stored in the storage area 22c is output to the display 8. In other words, the second B-picture is overwritten with the first B-picture. When the underflow of the bit buffer 2 occurs, therefore, the first B-picture whose decoding is in progress and the non-overwritten part of the second B-picture coexist in the B-picture storage area 22c, so that the screen of the display 8 is divided into two parts. As the B-picture has a low significance, however, the division of the screen can be avoided by skipping the B-picture whose decoding is in progress as discussed above. When the first I- or P-picture decoded by the decode core circuit 4 has been transferred to the forward reference area 22a, the second I- or P-picture already stored in the backward reference area 22b or the decoded B-picture stored in the B-picture storage area 22c is selectively output to the display 8. When the third I- or P-picture decoded by the decode core circuit 4 has been transferred to the backward reference area 22b, the fourth I- or P-picture already stored in the forward reference area 22a or the decoded B-picture stored in the B-picture storage area 22c is output to the display 8. Therefore, the first I- or P-picture is not overwritten with the second I- or P-picture, nor is the third I- or P-picture overwritten with the fourth I- or P-picture. Further, the decoding of the first or third I- or P-picture which has been in progress upon occurrence of the underflow of the bit buffer 2 is resumed after the underflow is released. Consequently, the completely decoded first or third I- or P-picture is stored in the forward reference area 22a or the backward reference area 22b. Accordingly, the first or third I- or P-picture can also be displayed on the display 8, thus providing moving pictures which show a smooth motion.

Although only seven embodiments of the present invention have been described herein, it should be apparent to those skilled in the art that the present invention may be embodied in many other specific forms without departing from the spirit or scope of the invention. Particularly, it should be understood that this invention may be embodied in the following forms.

This invention may be adapted for fast playback which involves a D-picture as well as I-, P- and B-pictures.

The coefficient n in the equation (8), Bthn=B−n×X=B−(n×RB/RP), may be changed to a value greater than the magnification n for the normal playback speed. For example, the coefficient n is set greater than "2" (n>2) in the 2× playback. In this case, as the coefficient n gets too large, the number of frames which are dropped from moving pictures to be displayed becomes larger. In this respect, the value of the coefficient n should best be set equal to the magnification n and it is preferable that the coefficient n be adjusted so as to suppress the number of dropped frames.

The first embodiment and the second embodiment may be combined. Likewise, the second embodiment and the seventh embodiment may be combined. Further, the sixth embodiment and the seventh embodiment may be combined.

In the first to seventh embodiments, the signal processing in the individual circuits 5, 6, 7, 34 and 42 may be replaced with software-based signal processing which is accomplished by using a CPU.

The frame buffer 22 may be provided separately from the bit buffer 2 in the fourth embodiment.

The frame buffer for storing the first video output of the first decoded I- or P-picture may be provided separately from the frame buffer 22 in the fifth embodiment.

In the sixth embodiment, the second threshold value BTH2 and the operation associated with this threshold value may be omitted.

The recording media usable in this invention include all kinds of digital recording media such as a CD-ROM, a hard disk and a video tape as well as a video CD.

The invention may be adapted not only for a video CD player but also players for storage media, such as a video tape recorder (VTR) and a digital video disk (DVD), which employs the MPEG system.

Therefore, the present examples and embodiments are to be considered as illustrative and not restrictive and the invention is not to be limited to the details given herein, but may be modified within the scope of the appended claims.

What is claimed is:

1. A video decoding apparatus for decoding a coded video bit stream including a series of pictures to produce decoded pictures, said apparatus having a plurality of playback modes, comprising:

a bit buffer for temporarily storing all of said video bit stream regardless of the playback mode;

a decoding circuit for receiving an amount of said video bit stream output from said bit buffer up to a threshold value and decoding said video bit stream to produce said decoded pictures; and a video bit stream control circuit, operatively connected to said bit buffer and said decoding circuit, for controlling an amount of all of said video bit stream to be supplied to said decoding circuit from said bit buffer based on an amount of data of all of said video bit stream stored in said bit buffer, wherein said control circuit determines whether an amount of data stored in said bit buffer exceeds the threshold value, the threshold value being predetermined as an amount of said video bit stream which can be safely stored in said bit buffer, and wherein said control circuit operates to skip a portion of all of said video bit stream in order to prevent the portion of all of said video bit stream from being supplied to said decoding circuit from said bit buffer as long as the amount of data stored in said bit buffer exceeds the threshold value.

2. The video decoding apparatus according to claim 1, wherein said video bit stream control circuit changes said threshold value in proportion to a playback speed for said decoded pictures.

3. The video decoding apparatus according to claim 2, wherein said video bit stream control circuit operates to skip a portion of said video bit stream in a picture by picture manner, as long as the amount of data stored in said bit buffer exceeds said threshold value.

4. The video decoding apparatus according to claim 2, wherein said video bit stream control circuit changes said threshold value based upon a video buffering verifier (VBV) buffer size, a bit rate and a picture rate which are defined by a sequence header included in said video bit stream, and based upon a magnification of an actual playback speed for a normal playback speed.

5. A video decoding apparatus for decoding a coded video bit stream including a series of pictures including an I-picture, a P-picture and a B-picture to produce decoded pictures, comprising:

a bit buffer for temporarily storing said video bit stream;

a decoding circuit for receiving said video bit stream output from said bit buffer and decoding said video bit stream to produce said decoded pictures; and a video bit stream control circuit, operatively connected to said bit buffer and said decoding circuit, for controlling an amount of said video bit stream to be supplied to said decoding circuit from said bit buffer based on an amount of data of said video bit stream stored in said bit buffer, wherein said control circuit determines whether an amount of data stored in said bit buffer exceeds a first threshold value that is predetermined as an amount of said video bit stream which can be safely stored in said bit buffer, said control circuit further operates to change said first threshold value in proportion to a playback speed of said decoded pictures, and wherein said control circuit operates to allow said video bit stream of said I-picture and said P-picture to be supplied to said decoding circuit, and operates to skip said video bit stream of said B-picture in order to prevent said video bit stream of said B-picture from being supplied to said decoding circuit from said bit buffer as long as the amount of data stored in said bit buffer exceeds said first threshold value.

6. The video decoding apparatus according to claim 5, wherein said video bit stream control circuit skips said video bit stream of said B-picture to be supplied next, even when an amount of data of said video bit stream stored in said bit buffer is smaller than said first threshold value, after said video bit stream of said I-picture or said P-picture is supplied to said decoding circuit from said bit buffer.

7. The video decoding apparatus according to claim 5, wherein said determining means determines whether the amount of data stored in said bit buffer exceeds the first threshold value and a second threshold value higher than the first threshold value, and wherein said video bit stream control circuit skips said video bit stream of said B-picture when the amount of data stored in said bit buffer exceeds said first threshold value, after said video bit stream of said I-picture or said P-picture is supplied to said decoding circuit, and skips said video bit stream of said B-picture when the amount of data stored in said bit buffer exceeds said second threshold value, after said video bit stream of said P-picture is supplied to said decoding circuit.

8. The video decoding apparatus according to claim 7, wherein said video bit stream control circuit changes said first and second threshold values based upon a video buffering verifier (VBV) buffer size, a bit rate and a picture rate which are defined by a sequence header included in said video bit stream, and based upon a magnification of an actual playback speed for a normal playback speed.

9. A video decoding apparatus for decoding a coded video bit stream including a series of pictures including an I-picture, a P-picture and a B-picture to produce decoded pictures, comprising:

a video bit stream analyzer for determining a picture type for each picture included in said video bit stream and analyzing an amount of data of said video bit stream picture by picture;

a bit buffer for temporarily storing said video bit stream from said video bit stream analyzer;

a decoding circuit for receiving said video bit stream output from said bit buffer and decoding said video bit stream to produce decoded pictures; and a video bit stream control circuit, operatively connected to said bit buffer and said decoding circuit, for controlling an amount of said video bit stream to be supplied to said decoding circuit from said bit buffer based upon an amount of data of said video bit stream stored in said bit buffer, wherein said control circuit determines whether an amount of data stored in said bit buffer exceeds a threshold value that is predetermined as an amount of said video bit stream which can be safely stored in said bit buffer, said control circuit further operates to change said threshold value in proportion to a playback speed of said decoded pictures, and wherein, when said control circuit determines that the amount of data stored in said bit buffer exceeds the threshold value, said control circuit operates to selectively skip a portion of said, video bit stream in a picture by picture manner in order to prevent said video bit stream from being supplied to said decoding circuit from said bit buffer, and the portion to be skipped is selected based upon the picture type for each picture and the amount of data for each picture, detected by said video bit stream analyzer.

10. The video decoding apparatus according to claim 9, wherein said video bit stream control circuit changes said threshold values based upon a video buffering verifier (VBV) buffer size, a bit rate and a picture rate which are defined by a sequence header included in said video bit stream, and based upon a magnification of an actual playback speed for a normal playback speed.

11. A video decoding apparatus for decoding a coded video bit stream including a series of pictures including an I-picture, a P-picture and a B-picture to produce decoded pictures, comprising:

a bit buffer for temporarily storing said video bit stream, said bit buffer having a capacity defined by adding a value obtained by dividing a bit rate by a picture rate to a video buffering verifier (VBV) buffer size;

a decoding circuit for receiving said video bit stream output from said bit buffer and decoding said video bit stream to produce said decoded pictures; and a video bit stream control circuit, operatively connected to said bit buffer and said decoding circuit, for controlling an amount of said video bit stream to be supplied to said decoding circuit from said bit buffer based on an amount of data of said video bit stream stored in said bit buffer, wherein said control circuit determines whether an amount of data stored in said bit buffer exceeds a first threshold value indicative of said VBV buffer size and a second threshold value indicative of a value obtained by adding a value resulting from division of said bit rate by said picture rate to said VBV buffer size, wherein said control circuit operates to allow said video bit streams of said I-picture and said P-picture to be supplied to said decoding circuit, and operates to skip said video bit stream of said B-picture in order to prevent said video bit stream of said B-picture from being supplied to said decoding circuit from said bit buffer as long as the amount of data of stored in said bit buffer lies between said first threshold value and said second threshold value, and further operates to skip a portion of said video bit stream regardless of a type of a picture as long as said amount of data stored in said bit buffer exceeds said second threshold value.

12. The video decoding apparatus according to claim 11, said video bit stream control circuit further comprising:

a picture header detector for determining a picture type for a picture based on a picture header included in said video bit stream output from said bit buffer.

13. The video decoding apparatus according to claim 11, wherein said bit buffer has a capacity defined by adding a value, obtained by dividing said bit rate by said picture rate, and a margin value to said VBV buffer size.

14. A video decoding apparatus for decoding a coded video bit stream including a series of pictures to produce decoded pictures, said apparatus having a plurality of playback modes, comprising:

a bit buffer for temporarily storing all of said video bit stream regardless of the playback mode;

a decoding circuit for receiving said video bit stream output from said bit buffer and decoding said video bit stream to produce said decoded pictures; and an operation control circuit for controlling a reading operation of said bit buffer and a decoding operation of said decoding circuit based on an amount of data of said video bit stream stored in said bit buffer being less than a threshold value that is predetermined as an amount of said video bit stream and indicates a possibility of an underflow of said bit buffer, wherein said operation control circuit operates to inhibit said reading operation of said bit buffer and said decoding operation of said decoding circuit when the amount of data is less than the threshold value in order to supply already-decoded pictures to said bit buffer during a period from a point of time at which an underflow of said bit buffer has occurred to a point of time at which the underflow is released.

15. The video decoding apparatus according to claim 14, wherein said operation control circuit determines whether the amount of data stored in said bit buffer is less than the threshold value, wherein said operation control circuit operates to inhibit said reading operation of said bit buffer and said decoding operation of said decoding circuit in order to supply the already-decoded pictures so long as the amount of data stored in said bit buffer is smaller than said threshold value.

16. The video decoding apparatus according to claim 15, wherein said threshold value is set to a value obtained by multiplying said bit rate by a video buffering verifier (VBV) delay value.

17. The video decoding apparatus according to claim 14, wherein said pictures include an I-picture, a P-picture and a B-picture, said operation control circuit determines a picture type for a picture based on a picture header included in said video bit stream output from said bit buffer, and, when said underflow of said bit buffer has occurred during decoding of said B-picture, said operation control circuit skips a remaining portion of said video bit stream of B-picture and continues decoding.

18. The video decoding apparatus according to claim 14, wherein said pictures include an I-picture, a P-picture and a B-picture, said operation control circuit determines a picture type for a picture based on a picture header included in said video bit stream output from said bit buffer, and, when said underflow of said bit buffer has occurred during decoding of said I-picture or said P-picture, said operation control circuit interrupts said decoding, and continues decoding said video bit stream of said I-picture or P-picture after releasing of said underflow.

19. A video decoding apparatus for decoding a coded video bit stream including a series of pictures including an I-picture, a P-picture and a B-picture to provide decoded pictures, comprising:

a video bit stream analyzer for determining a picture type for each picture included in said video bit stream and analyzing an amount of data of said video bit stream picture by pictures;

a bit buffer for temporarily storing said video bit stream from said video bit stream analyzer;

a decoding circuit for receiving said video bit stream output from said bit buffer and decoding said video bit stream to produce said decoded pictures;

a video bit stream control circuit, operatively connected to said bit buffer and said decoding circuit, for controlling an amount of said video bit stream to be supplied to said decoding circuit from said bit buffer based on an amount of data of said video bit stream stored in said bit buffer;

wherein said control circuit determines whether an amount of data stored in said bit buffer exceeds a threshold value that is predetermined at an amount of said video bit stream which can be safely stored in said bit buffer, said control circuit changes the threshold value in proportion to a playback speed of said decoded pictures;

wherein, when said control circuit determines that the amount of data stored in said bit buffer exceeds the threshold value, said control circuit operates to selectively skip a portion of said video bit stream in each picture in order to prevent said video bit stream from being supplied to said decoding circuit from said bit buffer, and the portion to be skipped is selected based upon the picture type and the amount of data for each picture, detected by said video bit stream analyzer; and a frame buffer for storing decoded pictures produced by said decoding circuit, said frame buffer comprising:

a forward reference area for storing a decoded I-picture or P-picture to be used in backward prediction decoding to be executed by said decoding circuit;

a backward reference area for storing a decoded I-picture or P-picture to be used in forward prediction decoding to be executed by said decoding circuit; and a B-picture storage area for storing a decoded B-picture, wherein said video bit stream control circuit uses said B-picture storage area as an expansion memory for said bit buffer when skipping the B-pictures within said video stream.

20. The video decoding apparatus according to claim 19, wherein said decoding circuit continuously produces two decoded I-pictures or P-pictures in one frame period, stores the first I-picture or P-picture as a reference picture in forward prediction decoding or backward prediction decoding to said B-picture storage area, and outputs the second I-picture or P-picture, which has been decoded later, as a playback picture.

21. A video decoding apparatus for decoding a coded video bit stream including a series of pictures including an I-picture, a P-picture and B-picture to produce decoded pictures, comprising:

a video bit stream analyzer for determining a picture type for each picture included in said video bit stream and analyzing an amount of data of said video bit stream picture by picture;

a bit buffer for temporarily storing said video bit stream from said video bit stream analyzer;

a decoding circuit for receiving said video bit stream output from said bit buffer and decoding said video bit stream to produce said decoded pictures; and a video bit stream control circuit, operatively connected to said bit buffer and said decoding circuit, for controlling an amount of said video bit stream to be supplied to said decoding circuit from said bit buffer based upon an amount of data of said video bit stream stored in said bit buffer;

wherein said control circuit determines whether an amount of data stored in said bit buffer exceeds a threshold value that is predetermined as an amount of said video bit stream which can be safely stored in said bit buffer, wherein said control circuit changes the threshold value in proportion to a playback speed of said decoded pictures;

wherein, when said control circuit determines that the amount of data stored in said bit buffer exceeds the threshold value, said control circuit operates to selectively skip a portion of said video bit stream in each picture in order to prevent said video bit stream from being supplied to said decoding circuit from said bit buffer, and the portion to be skipped is selected based upon the picture type and the amount of data for each picture detected by said video bit stream analyzer; and wherein said decoding circuit continuously produces two decoded I-pictures or P-pictures in one frame period, stores the first I-picture or P-picture as a reference picture in forward prediction decoding or backward prediction decoding, and outputs the second I-picture or P-picture, which has been decoded later, as a playback picture.

22. A video decoding apparatus for decoding a coded video bit stream including a series of pictures to produce decoded pictures, wherein said pictures include an I-picture, a P-picture and a B-picture, comprising:

a bit buffer for temporarily storing said video bit stream;

a decoding circuit for receiving said video bit stream output from said bit buffer and decoding said video bit stream to produce said decoded pictures;

an operation control circuit for controlling a reading operation of said bit buffer and a decoding operation of said decoding circuit based on amount of data of said video bit stream stored in said bit buffer, wherein said operation control circuit operates to inhibit said reading operation of said bit buffer and said decoding operation of said decoding circuit in order to supply already decoded pictures during a period from a point of time at which an underflow of said bit buffer has occurred to a point of time at which the underflow is released, and wherein said operation control circuit determines a picture type of said pictures based on a picture header included in said video bit stream output from said bit buffer, and, when said underflow of said bit buffer has occurred during decoding of said I-picture or said P-picture, said operation control circuit interrupts said decoding, and continues decoding said video bit stream of said I-picture or P-picture after releasing of said underflow; and a frame buffer for storing decoded pictures produced by said decoding circuit, said frame buffer comprising:

a forward reference area for storing a decoded I-picture or P-picture to be used in backward prediction decoding to be executed by said decoding circuit;

a backward reference area for storing a decoded I-picture or P-picture to be used in forward prediction decoding to be executed by said decoding circuit; and a B-picture storage area for storing a decoded B-picture.

23. The video decoding apparatus according to claim 22, wherein said operation control circuit controls said frame buffer in such a manner that when a decoded first I-picture or P-picture has been transferred to said forward reference area, a second decoded I-picture or P-picture already stored in said backward reference area or the decoded B-picture stored in said B-picture storage area is read as a playback picture, and that when a decoded third I-picture or P-picture has been transferred to said backward reference area, a fourth decoded I-picture or P-picture already stored in said forward reference area or the decoded B-picture stored in said B-picture storage area is read as said playback picture.

\* \* \* \* \*